United States Patent
Honzal et al.

(10) Patent No.: US 7,970,728 B2
(45) Date of Patent: Jun. 28, 2011

(54) DYNAMICALLY BUILDING AND POPULATING DATA MARTS WITH DATA STORED IN REPOSITORIES

(75) Inventors: Benjamin Honzal, Boeblingen (DE); Holger Kache, San Jose, CA (US); Mary A. Roth, San Jose, CA (US); Guenter A. Sauter, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 418 days.

(21) Appl. No.: 12/256,635

(22) Filed: Oct. 23, 2008

(65) Prior Publication Data
US 2010/0106747 A1 Apr. 29, 2010

(51) Int. Cl.
*G06F 17/30* (2006.01)
(52) U.S. Cl. .................. 707/600; 707/695; 707/806
(58) Field of Classification Search .......... 707/600, 707/606, 695, 806, 999.1, 999.203
See application file for complete search history.

(56) References Cited

U.S. PATENT DOCUMENTS

| | | | |
|---|---|---|---|
| 6,167,405 A * | 12/2000 | Rosensteel et al. | 1/1 |
| 6,212,524 B1 | 4/2001 | Weissman et al. | |
| 6,385,604 B1 * | 5/2002 | Bakalash et al. | 1/1 |
| 6,651,062 B2 * | 11/2003 | Ghannam et al. | 1/1 |
| 6,721,749 B1 | 4/2004 | Najm et al. | |
| 7,117,215 B1 | 10/2006 | Kanchwalla et al. | |
| 7,313,561 B2 | 12/2007 | Lo et al. | |
| 7,315,849 B2 * | 1/2008 | Bakalash et al. | 1/1 |
| 7,319,996 B2 | 1/2008 | Chen et al. | |
| 7,333,982 B2 * | 2/2008 | Bakalash et al. | 707/600 |
| 7,392,248 B2 * | 6/2008 | Bakalash et al. | 1/1 |
| 7,680,828 B2 * | 3/2010 | Gorelik | 707/763 |
| 7,730,057 B2 * | 6/2010 | Bell et al. | 707/720 |
| 2004/0181440 A1 | 9/2004 | Yeh et al. | |
| 2006/0031250 A1 | 2/2006 | Henigman et al. | |
| 2006/0117057 A1 | 6/2006 | Legault et al. | |
| 2006/0259507 A1 | 11/2006 | Higuchi | |
| 2006/0271568 A1 * | 11/2006 | Balkir et al. | 707/100 |
| 2007/0185867 A1 | 8/2007 | Maga et al. | |
| 2007/0250524 A1 | 10/2007 | Le | |
| 2007/0294208 A1 | 12/2007 | Chowdhary et al. | |
| 2008/0021893 A1 * | 1/2008 | Bakalash et al. | 707/4 |
| 2008/0021915 A1 * | 1/2008 | Bakalash et al. | 707/101 |
| 2008/0027970 A1 | 1/2008 | Zhuge et al. | |
| 2008/0104089 A1 | 5/2008 | Pragada et al. | |
| 2009/0012816 A1 * | 1/2009 | Cookson et al. | 705/3 |

OTHER PUBLICATIONS

L. Schlesinger, A. Bauer, W. Lehner, G. Ediberidze, & M. Gutzmann, "Efficiently Synchronizing Multidimensional Schema Data", Proceedings of the 4th ACM International Workshop, pp. 1-8, Nov. 2001.*
Karayannidis, et al., "Processing Star Queries on Hierarchically-Clustered Fact Tables" pp. 1-12, 2002.
Veerman, Erik, "Designing a Dimensional Model," pp. 1-21.

\* cited by examiner

*Primary Examiner* — Cheryl Lewis
(74) *Attorney, Agent, or Firm* — Patterson & Sheridan, LLP

(57) ABSTRACT

Methods, systems, and articles of manufacture for constructing and populating data marts with dimensional data models from a set of data repositories that contain factual and association information about a set of related assets are disclosed. An intermediate data warehouse is generated to process the facts and associations for each asset. Using the intermediate warehouse, one or more data marts are generated with fact tables, dimensions, and hierarchies to fully model the information available for each asset.

25 Claims, 18 Drawing Sheets

FROM FIG. 13A

DYNAMICALLY BUILDING AND POPULATING DATA MARTS WITH DATA STORED IN REPOSITORIES

FIELD OF THE INVENTION

Embodiments of the invention generally relate to databases. More specifically, embodiments of the invention relate to techniques for building and populating data marts with data from data repositories.

DESCRIPTION OF THE RELATED ART

Data warehouses have become ubiquitous over the past two decades as means of providing an enterprise with decision support systems to identify trends and to execute strategic planning. Data marts constructed with fact tables and dimensional data models lie at the heart of such systems because such data marts offer a flexible and high-performance way to perform business analytics.

A significant cost in building such data marts lies in constructing the fact and dimension tables with a schema and with data from the different operational systems that contribute to the overall data warehouse content. In a typical approach, the IT staff builds a dimensional data model using a modeling tool of some kind, such as DB2 Warehouse Edition, Cognos Framework Manager, or Hyperion Essbase. This model often consists of a fixed set of facts, hierarchies and dimensions. For example, a retail store might build a fact table that contains data about its transactions, with dimensions based on store, time, and product.

Once the model is designed, it can be used to build and populate a data mart with data such that the dimensions and hierarchies can be used to efficiently query that data. However, the dimensional model itself is typically fixed in the definition of the hierarchies, the number of levels in the hierarchies, and the number of dimensions. This makes it difficult to change the dimensional model when the enterprise makes changes to the structure of the operational systems that populate the warehouse. Further, once the data is migrated to the new model, the old model is often lost, making it difficult to maintain a historical perspective of the warehouse data.

SUMMARY OF INVENTION

One embodiment of the invention includes a computer-implemented method for dynamically building and populating a data mart with data from a data repository. The method may generally include receiving a user configuration that specifies a data repository and an asset type in the data repository; generating a schema for an intermediate data warehouse for storing data relevant to the asset type, wherein the data relevant to the asset type comprises all measures for all assets of the asset type; populating the intermediate data warehouse by querying the data repository for the data relevant to the asset type; generating a schema for a data mart corresponding to the asset type; and populating the data mart by querying the intermediate data warehouse for the data relevant to the asset type.

Another embodiment of the invention includes a computer-readable storage medium containing a program which, when executed, performs an operation for dynamically building and populating a data mart with data from a data repository. The operation may generally include receiving a user configuration that specifies a data repository and an asset type in the data repository; generating a schema for an intermediate data warehouse for storing data relevant to the asset type, wherein the data relevant to the asset type comprises all measures for all assets of the asset type; populating the intermediate data warehouse by querying the data repository for the data relevant to the asset type; generating a schema for a data mart corresponding to the asset type; and populating the data mart by querying the intermediate data warehouse for the data relevant to the asset type.

Still another embodiment of the invention includes a system having processor and a memory containing a program, which when executed by the processor is configured to perform an operation for dynamically building and populating a data mart with data from a data repository. The operation should generally include receiving a user configuration that specifies a data repository and an asset type in the data repository; generating a schema for an intermediate data warehouse for storing data relevant to the asset type, wherein the data relevant to the asset type comprises all measures for all assets of the asset type; populating the intermediate data warehouse by querying the data repository for the data relevant to the asset type; generating a schema for a data mart corresponding to the asset type; and populating the data mart by querying the intermediate data warehouse for the data relevant to the asset type.

Yet another embodiment of the invention includes a computer-implemented method for dynamically building and populating a data mart with data from a data repository. The method may generally include receiving user configuration input that specifies the plurality of data repositories and a plurality of asset types in the plurality of data repositories, wherein the specified plurality of data repositories contain: (i) a plurality of assets of the specified plurality of asset types; (ii) at least one association between assets of two asset types; (iii) at least one asset group that groups assets based on the at least one association between two asset types; and (iv) a plurality of measures of at least one measure type, wherein the plurality of measures contain values that describe the plurality of assets; generating a schema for an intermediate data warehouse for storing data relevant to the specified plurality of asset types, wherein the data relevant to the specified plurality of asset types comprises (i) measures for measure types for assets of the specified plurality of asset types; (ii) at least one association between an asset of one asset type of the specified plurality of asset types and an asset of another asset type of the specified plurality of asset types; and (iii) at least one asset group that groups assets of the specified plurality of asset types; and wherein the schema for the intermediate data warehouse comprises a timestamp to allow versioning of records in the intermediate data warehouse; populating the intermediate data warehouse by querying the specified plurality of data repositories for the data relevant to the specified plurality of asset types; generating, for each asset type of the specified plurality of asset types, a schema for a data mart corresponding to the respective asset type; wherein the schema for the data mart comprises (i) a static dimension representing measure types and (ii) a static dimension representing time to allow versioning of records in the data mart; wherein a static dimension is a dimension that exists in each of the plurality of data marts; and populating, for each asset type of the specified plurality of asset types, the data mart corresponding to the respective asset type by querying the intermediate data warehouse for the data relevant to the respective asset type.

Another embodiment of the invention includes a computer-readable storage medium containing a program which, when executed, performs an operation for dynamically building and populating a data mart with data from a data repository. The operation may generally include receiving user configuration input that specifies the plurality of data repositories and a plurality of asset types in the plurality of data repositories, wherein the specified plurality of data repositories contain: (i) a plurality of assets of the specified plurality of asset types; (ii) at least one association between assets of two asset types; (iii) at least one asset group that groups assets based on the at least one association between two asset types; and (iv) a plurality of measures of at least one measure type, wherein the plurality of measures contain values that describe the plurality of assets; generating a schema for an intermediate data warehouse for storing data relevant to the specified plurality of asset types, wherein the data relevant to the specified plurality of asset types comprises (i) measures for measure types for assets of the specified plurality of asset types; (ii) at least one association between an asset of one asset type of the specified plurality of asset types and an asset of another asset type of the specified plurality of asset types; and (iii) at least one asset group that groups assets of the specified plurality of asset types; and wherein the schema for the intermediate data warehouse comprises a timestamp to allow versioning of records in the intermediate data warehouse; populating the intermediate data warehouse by querying the specified plurality of data repositories for the data relevant to the specified plurality of asset types; generating, for each asset type of the specified plurality of asset types, a schema for a data mart corresponding to the respective asset type; wherein the schema for the data mart comprises (i) a static dimension representing measure types and (ii) a static dimension representing time to allow versioning of records in the data mart; wherein a static dimension is a dimension that exists in each of the plurality of data marts; and populating, for each asset type of the specified plurality of asset types, the data mart corresponding to the respective asset type by querying the intermediate data warehouse for the data relevant to the respective asset type.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
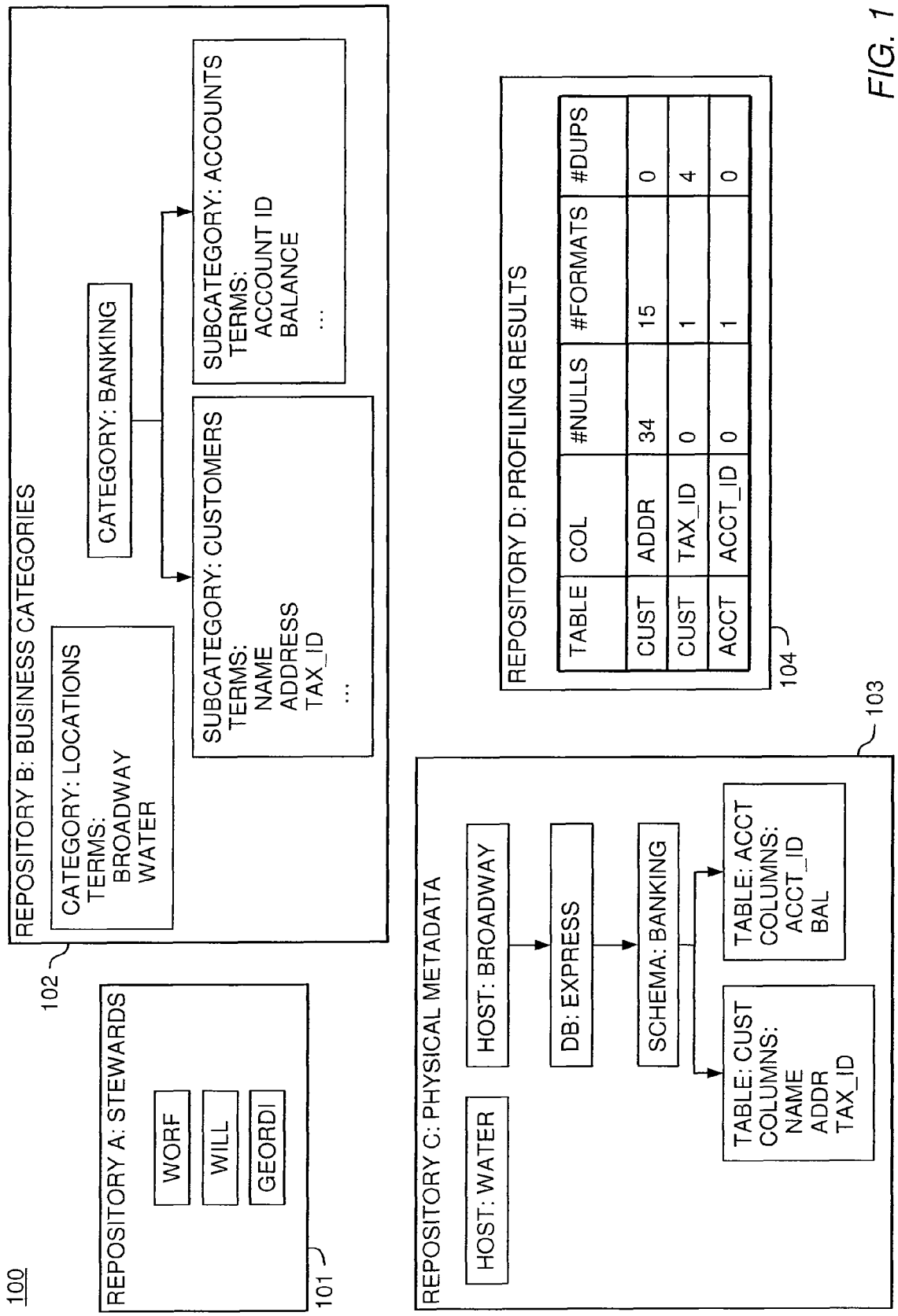
FIG. 1 is a block diagram illustrating an example of assets stored in data repositories, according to one embodiment of the invention.

Embodiments of the invention provide techniques for building and populating data marts with data from data repositories. Specifically, embodiments of the invention provide techniques to dynamically construct and populate data marts with dimensional data models from a set of data repositories that contain factual and association information about a set of related information assets. In one embodiment, an information asset, or simply an asset, is an entity described by a set of facts and associations to other assets. Facts may be attributes (strings), simple measures (observed numeric values; may also be strings), and complex measures, a.k.a. scores (computed numeric values), according to one embodiment of the invention. In one embodiment, a data mart is an instance of one or more snowflake schemas populated with data. Without loss of generality, it may be assumed that a data mart is made up of one snowflake schema; it is a straightforward extension to group multiple snowflake schemas into a data mart. In one embodiment, the dimensions, hierarchies, and fact tables of the data marts are dynamically derived from the asset data and associations of the data repositories. Further, the dimensions, hierarchies, and fact tables may change over time. According to one embodiment, the data marts accurately reflect the structure at any given point in time.

In one embodiment, an intermediate data warehouse is generated to process the facts and associations about each asset. In one embodiment, a warehouse is a database that contains asset data (facts and associations) collected at various points in time from a variety of data repositories. The intermediate data warehouse captures all relevant data from the data repositories that store information about assets. Information about assets includes facts about the assets and how the assets are related to each other. New facts may be added to the data repositories over time, and associations between assets may change over time.

In one embodiment, a technique is provided for automatically generating one or more data marts based on the intermediate data warehouse. The generated data marts allow a user to perform analysis over the assets and their associations to each other at any given point in time. In a particular embodiment, data marts are built by generating snowflake schemas (or star schemas) for the assets such that (i) the facts are used to populate a fact table; and (ii) the associations are used to populate dimensions and to create hierarchies. In one embodiment, a snowflake schema is a database schema definition such that centralized fact tables are connected to multiple dimensions. In one embodiment, a star schema is a specialization of a snowflake schema in which the dimensions are represented in a single table.

In one embodiment, data marts are defined and populated automatically rather than through a set of manual steps undertaken by a warehouse developer. Information about the assets described by the data marts may be extracted from several different repositories. For example, some information about the assets may be stored in one or more relational databases, while other information may come from an asset repository or a file system. Schemas for data marts are automatically derived from assets and associations in the data repositories. Each snowflake schema or star schema is constructed dynamically and includes facts, dimensions, and hierarchies. Hierarchies are defined for every derived dimension and may be balanced, unbalanced, or ragged based on the associations detected in the assets.

One embodiment preserves a historic view of the data retrieved from the underlying data repositories. Thus, while some of the data repositories may only keep a single state of the data (e.g., the most current state), the intermediate data warehouse schema may show a progression of the asset state over time and across different repositories. In this way, a user may access previous versions of the data retrieved from the underlying data repositories.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram illustrating an example 100 of data repositories containing assets, according to one embodiment of the invention. As shown in FIG. 1, several repositories 101, 102, 103, 104 store data containing information about a financial institution, e.g., bank. Repository C 103 describes a relational database schema for the tables that hold banking data. Illustratively, the relational database schema for these tables is described in terms of host, database schema, table, and column information. Here, "host" refers to a server that is hosting a particular database. For example, as shown in Repository C 103, host "BROADWAY" is a server that is hosting the database "EXPRESS". Repository D 104 contains profiling results over the columns of the tables that hold banking data. The profiling results report information such as the number of duplicate or null values in a column, the number of different formats a column contains, etc. Repository B 102 describes the business meaning of the banking data, via a hierarchical glossary that defines business categories and business terms for the banking data. For example, the category "Locations" classifies data by the physical location of the data. A category may also be further subdivided into subcategories. For example, "Banking" is subdivided into two subcategories, "Customers" and "Accounts", which provide business definitions for customer and account data, respectively. Finally, repository A 101 describes data stewards (i.e., users), who are assigned to govern the usage and definition of business categories and terms in repository B 102 that describe different areas of data in repository C 103.

Figure 2:
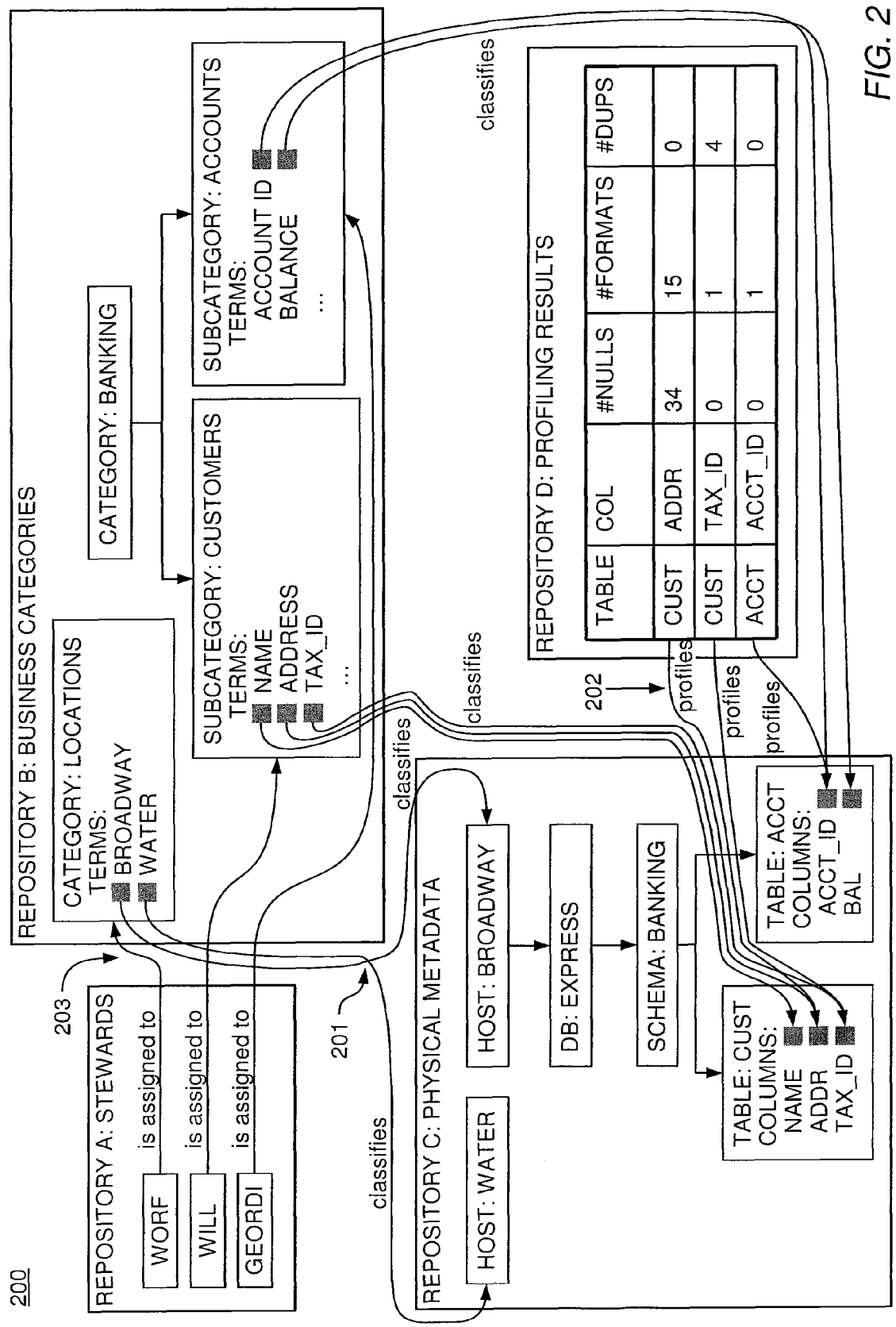
FIG. 2 is a block diagram illustrating an example of associations between assets stored in data repositories, according to one embodiment of the invention.

Assets may be further described by associations to other assets. FIG. 2 is a block diagram illustrating an example 200 of associations between assets stored in data repositories, according to one embodiment of the invention. Profiling results in repository D 104 relate back 202 to respective column definitions in repository C 103. Further, the columns, tables, and databases in Repository C 103 are classified 201 by the business terms and categories in repository B 102.

Finally, stewards in repository A 101 are assigned 203 to manage business categories and terms in repository B 102.

Figure 3:
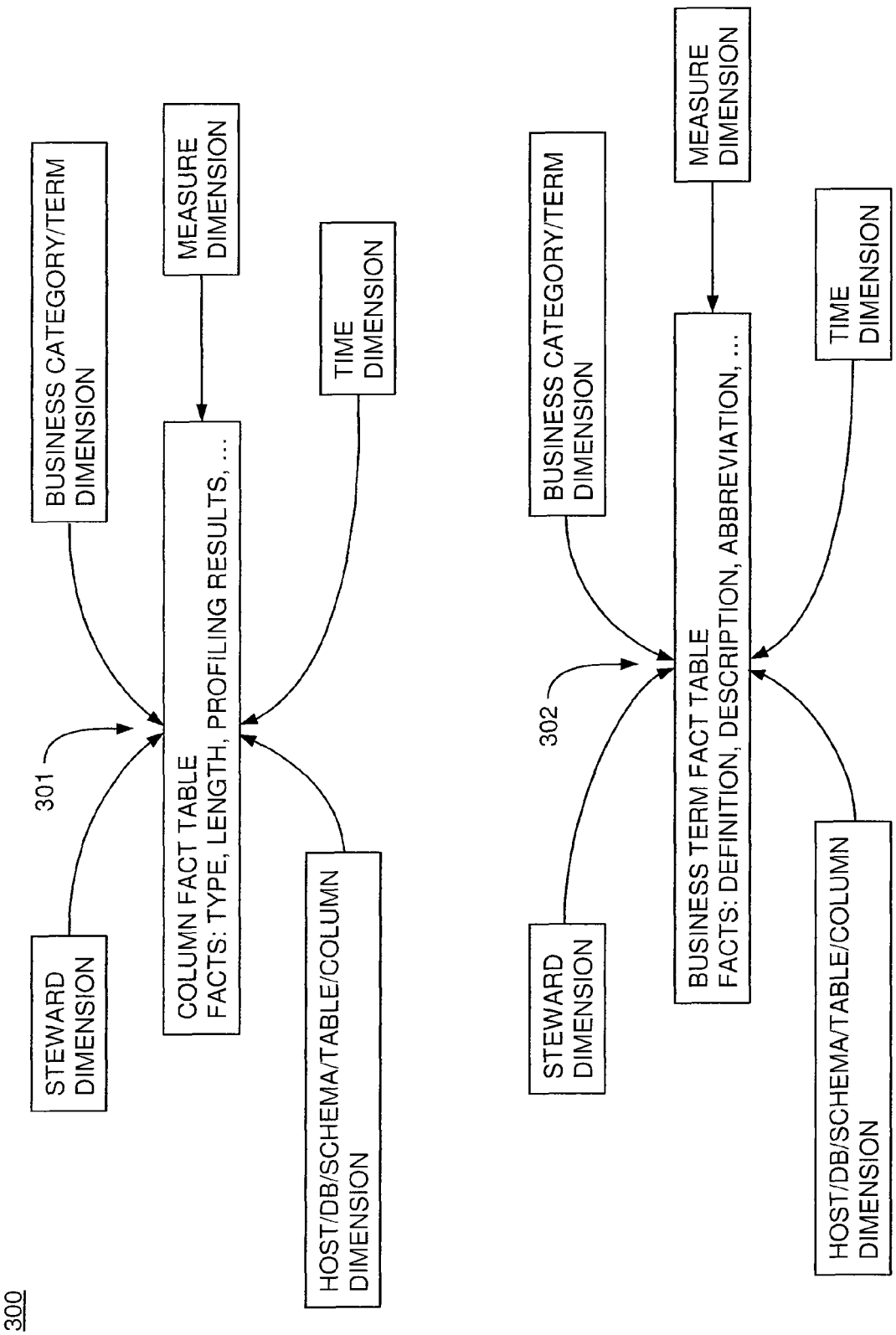
FIG. 3 is a block diagram illustrating examples of possible data mart schemas for assets stored in data repositories, according to one embodiment of the invention.

Data mart schemas may be built using assets stored in data repositories. FIG. 3 is a block diagram illustrating examples of data mart schemas 300 for assets stored in data repositories, according to one embodiment of the invention. Specifically, FIG. 3 shows examples of two possible snowflake schemas for data marts built using the assets stored in the data repositories of FIGS. 1 and 2. The top schema is a snowflake schema 301 for a data mart for the "column" asset type. This schema includes a fact table for columns. In general, a fact table contains measurements, metrics, or facts of an information asset. Illustratively, the facts stored in the fact table are derived from physical metadata about columns (such as data type and length) and facts derived from profiling information (such as number of values, number of nulls, number of data formats, number of duplicates, etc.). In addition to a time dimension, dimensions for the fact table may be derived from the associations shown in FIG. 2, including physical database schemas, business categories, and stewards.

The bottom schema is a snowflake schema 302 for a data mart for the "business term" asset type. This schema 302 includes fact table for business terms. Facts stored in the fact table include facts about the business term (such as its name, description, synonyms, and abbreviations). Once again, the dimensions for this fact table are derived from associations of this asset type to other asset types, as shown in FIG. 2. In both schemas 300, facts are qualified by a measure dimension, such that facts of new measure types may be added without having to modify the snowflake schemas. Specifically, the measure dimension captures information about measure types and may support new measure types without requiring fact table schema to be updated to contain new fields.

Figure 4:
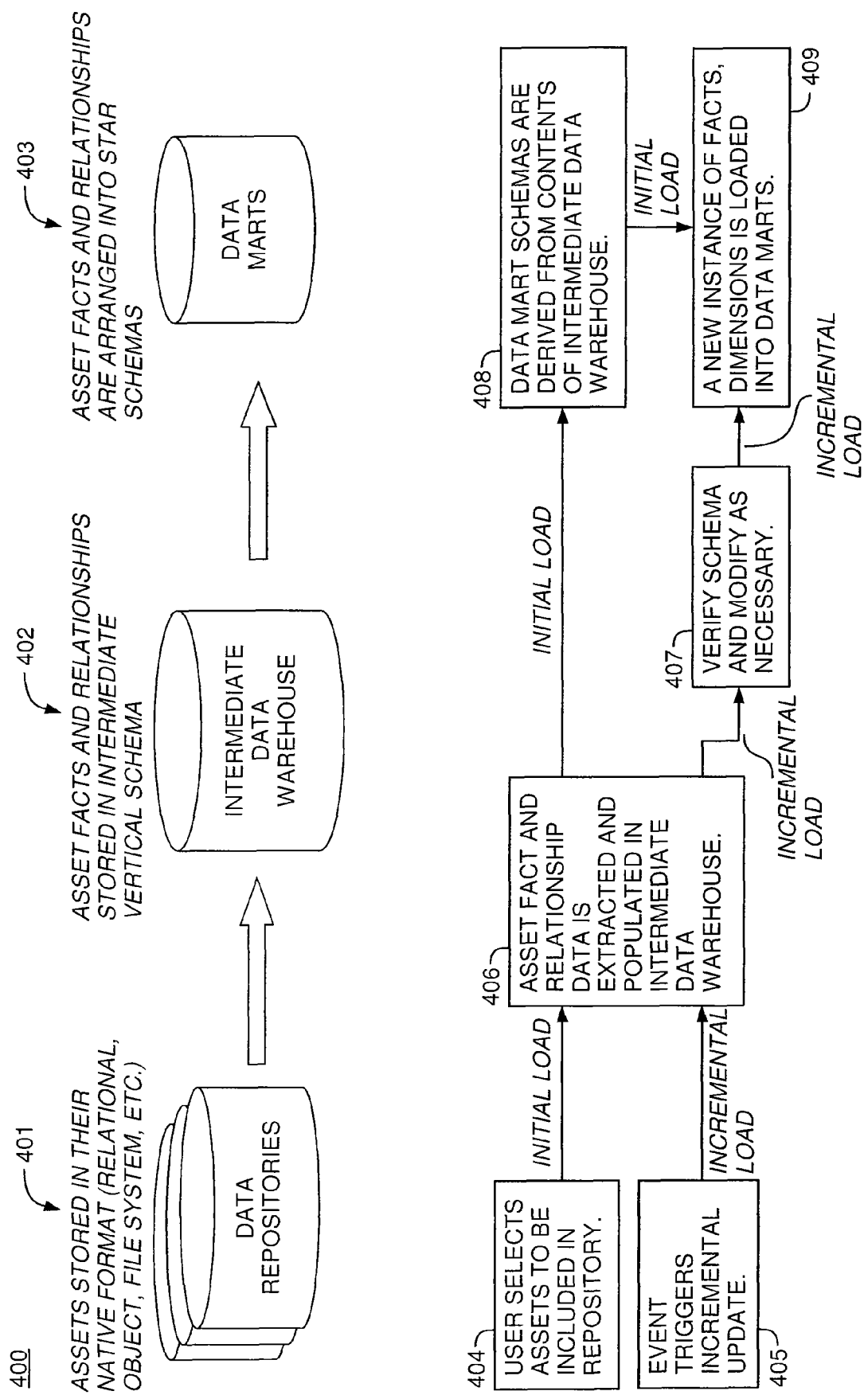
FIG. 4 is a structural diagram illustrating a high-level overview of building and populating data marts using data from data repositories, according to one embodiment of the invention.

In one embodiment, data marts are dynamically built for groups of related assets that are stored in a variety of data repositories. FIG. 4 is a structural diagram illustrating a process of building and populating data marts using data from data repositories, according to one embodiment of the invention. Specifically, FIG. 4 shows data flows of assets from data repositories 401, to an intermediate warehouse 402, and to data marts 403, which proceeds according to the method 500 of FIG. 5, described below. FIG. 4 also shows an initial load 404 of data into the data marts and an incremental load 405.

As shown in FIG. 4, in building data marts, assets flow from data repositories 401 to data marts 403, according to one embodiment of the invention. Assets are initially found in data repositories 401, where the assets are stored in their native format (relational, object, file system, etc.). Next, assets flow from data repositories 401 to an intermediate data warehouse 402. In the intermediate warehouse 402, assets (including their facts and associations) are stored in a vertical schema. In one embodiment, a vertical schema is a schema made up of one or more vertical tables. A vertical table T' is a table where for a regular table T with columns <Row ID, C1 ... Cn>T' is a pivot of T such that T' has at least 3 columns, <Row ID, Column ID, C>.and Row ID qualifies the row, Column ID qualifies the column, and C holds the actual value. The identifier used for each such record may be referenced as a foreign key by other tables and the schema becomes a 3NF schema. Once the intermediate data warehouse 402 is loaded with asset facts and associations, the intermediate data warehouse 402 may be queried to define the particular schema of the data marts. Data marts 403 are constructed as star or snowflake schemas based on the data found in the intermediate data warehouse 402. Finally, assets flow from the intermediate data warehouse 402 to data marts 403 where the assets are stored in the particular star schema or snowflake schema constructed.

An overview of an initial load 404 is also shown in FIG. 4. An initial load is a sequence of events consisting of the first population of the intermediate data warehouse with assets of a particular asset type, the construction of the data marts used for the assets of the particular asset type, and the first population of the constructed data mart with asset data of the particular asset type. In one embodiment, the sequence of events can be realized as follows. First, a user is asked to identify the data repositories 401 that contain assets to be included in the data marts and to select which assets in those data repositories 401 to include. The selected assets are extracted 406 from the data repositories 401 via APIs provided by the data repositories 401 and are stored in an intermediate warehouse 402. The data stored in the intermediate warehouse 402 will be consumed by the next step in the process. In a particular embodiment, standard vertical schema techniques are used such that data values are (name, value) pairs. Doing so provides the flexibility to represent fact and association data for different types of assets, regardless of repository type, asset type, or format. However, the techniques described herein do not pre-suppose a vertical schema, and other schema types are broadly contemplated and use of such schemas is considered to be embodiments of the invention.

Next, a set of snowflake schemas are derived 408 to represent the assets. Other schemas, such as star schemas, are broadly contemplated and use of such schemas is considered to be embodiments of the invention. Schema elements, including facts, dimensions, and hierarchies, are constructed based on the data stored in the intermediate warehouse 402. In one embodiment, facts may be attributes, simple measures, and complex measures, as noted above. Dimensions are derived from the particular associations of the assets in the data repositories 401. In addition, in one embodiment, the intermediate warehouse schema 402 includes a timestamp to allow versioning of data. The timestamp may be used later to create a time dimension in each data mart 403. Once the snowflake schemas have been created, an initial load is performed to populate the data marts 403 with data from the intermediate data warehouse 402.

After the initial load is complete, embodiments of the invention may be used to incrementally load the intermediate warehouse 402 and data marts 403 with a new version of asset facts and associations that were extracted from the data repositories 401. For example, the incremental load may be triggered by user action, by an event (e.g., monitoring the refresh date of a data repository to discover that an incremental load is needed), or according to a predefined schedule. An overview of an incremental load is also shown in FIG. 4. For example, at step 405, an event triggers an incremental update. At step 406, asset fact and association data is extracted and populated in the intermediate warehouse. At step 407, the schema is verified and modified as necessary. For example, a change in the data repository, such as an association with a new asset type, may require a change in a data mart schema, such as creating a new dimension in the data mart schema. At step 409, a new instance of fact and dimensions is loaded into the data marts. After step 409, the incremental load terminates.

Figure 5:
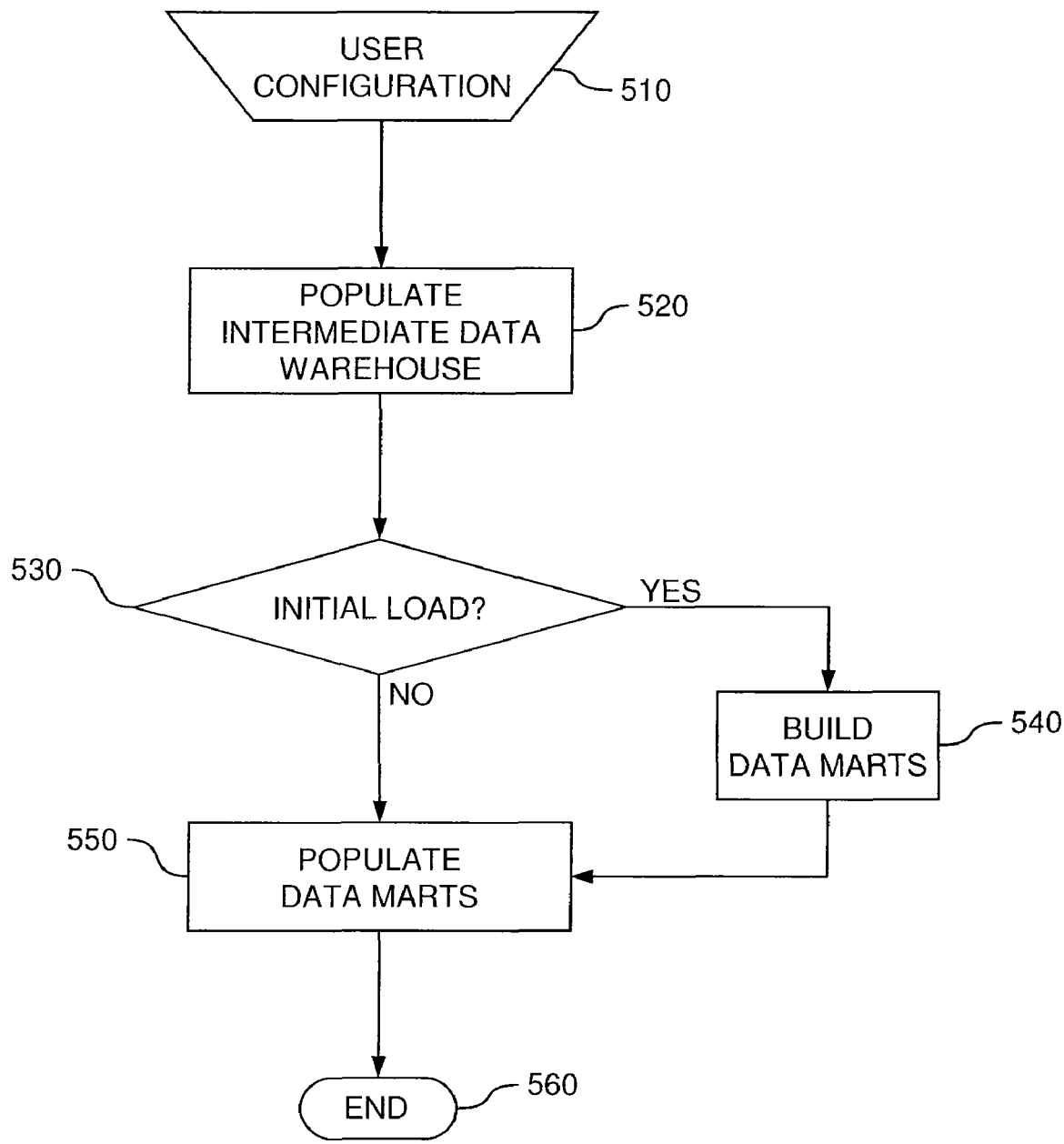
FIG. 5 is a flow diagram illustrating a high-level flow for building and populating data marts using data from data repositories, according to one embodiment of the invention.

FIG. 5 is a flow diagram illustrating one embodiment of a method 500 for building and populating data marts using data from data repositories, such as the repositories and data marts described above with respect to FIG. 4. Mechanisms of building and populating the intermediate data warehouse and the data marts, respectively, are described in greater detail below with respect to subsequent figures. Specifically, FIGS. 7-8 describe the mechanisms of building and populating the intermediate warehouse, while FIGS. 9-12 describe the mechanisms of building and populating the data marts.

As shown in FIG. 5, method 500 begins at step 510, where a user configuration is received to provide the necessary input. The user configuration may include, for example, location URIs of data repositories, authentication information for the data repositories, and a description of assets for which to extract fact and association information. The user configuration may be of any format, e.g., an XML file or a set of relational tables. At step 520, an intermediate data warehouse is created and populated with relevant information from the data repositories. The user configuration determines what data is considered to be relevant and how to retrieve the data for storage in the intermediate data warehouse. A detailed flow illustrating the mechanism of populating the data warehouse may be found in FIG. 8, which is described below.

At step 530, the method 500 distinguishes between an initial load and an incremental load scenario. An initial load is a capture of a single first state of the data in the repository into the data warehouse. An incremental load is an update of the data warehouse with a second (i.e., new) state of the data in the repository. For example, a data repository goes to a second state when, at a later point in time following the initial load, some of the data in the data repository has changed or has been newly added.

In the case of an initial load, the method 500 proceeds from step 530 to step 540, at which a set of data marts is built based on the data in the intermediate warehouse. All the data in the warehouse describe some asset, and all the assets may be grouped by their asset type. The method 500 builds data marts for asset types. Put another way, a data mart is built for each respective asset type so that each data mart will describe assets of the same type. The list of data marts may be exhaustive and include one data mart for every asset type in the data repositories. Alternatively, the list of data marts may be limited to only a sub-set of asset types via the user configuration. A snowflake schema for each asset type is constructed based on the associations found in the intermediate data warehouse for the particular asset type. Snowflake schemas for different asset types may have vastly different definitions. A detailed flow illustrating the mechanism of building data marts may be found in FIG. 11 of this disclosure. Finally, at step 550, the method 500 initially populates the set of data marts to represent the captured first state of the data repository. After step 550, the method 500 terminates.

If, however, an incremental load is taking place, the method 500 proceeds from step 530 directly to step 550, at which the new or modified data is added to the existing data marts. At step 550, for each existing data mart, a set of steps are performed to populate it. In one embodiment, the population mechanism is identical regardless of an initial or incremental load scenario. In another embodiment the population mechanism for the incremental load could differ from the population mechanism for the initial load such that only added or modified data is populated with a timestamp. The population mechanism relies on the data mart definition of the respective data mart. A detailed flow illustrating the mechanism of populating the data marts may be found in FIG. 12, which is described below. After step 550, the method 500 terminates.

Figure 6:
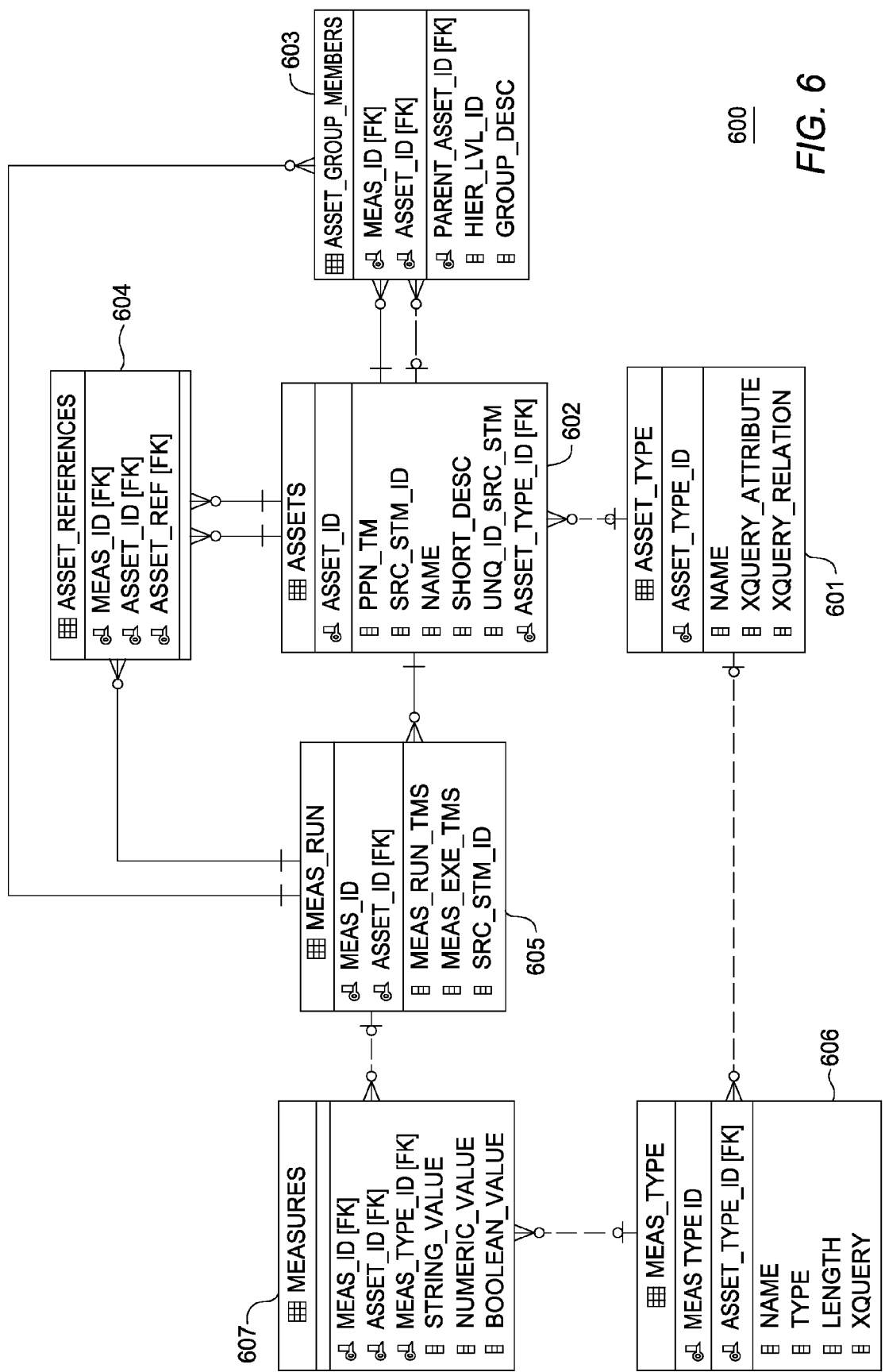
FIG. 6 is a block diagram illustrating an example of a vertical schema for an intermediate data warehouse, according to one embodiment of the invention.

In one embodiment of the invention, assets from the data repositories are stored into an intermediate data warehouse implemented as a vertical schema. FIG. 6 is a block diagram illustrating an example of a vertical schema 600 for an intermediate data warehouse, according to one embodiment of the invention. The intermediate data warehouse captures information from the various data repositories into a homogeneous format which may be used to facilitate the building of data marts.

An intermediate data warehouse schema exhibits certain properties. According to one embodiment, three properties of an intermediate data warehouse are specified. First, assets may be uniquely identified in the data warehouse. The identity of an asset may be used to derive facts about the asset and to derive associations of the asset to other assets. Facts may be simple measures, which are the base data of an asset, such as a name. Facts may also be complex measures that are derived via computation on the base data of an asset. Second, associations between assets may be direct (asset(a)→asset(b)) or transitive (asset(a)→asset(b)→asset(c)). The set of dimensions for a snowflake schema will be derived from the direct associations of an asset. Hierarchies for the dimensions will be derived for the transitive associations. Third, if a historical view of an asset is desired, then the intermediate data warehouse will associate a timestamp with the facts and associations of the asset.

As shown in FIG. 6, the vertical schema for the intermediate data warehouse satisfies the aforementioned three properties of an intermediate data warehouse. Using the vertical schema, the intermediate data warehouse may also represent new asset types without modification of the vertical schema. As shown, every box in the diagram represents a table in a relational database. Connectors between the tables represent primary-key/foreign-key associations. The direction of the association is from the end with the anchor (the foreign-key column) to the end without the anchor (the primary-key column). Foreign-keys are marked with [FK] and primary-keys are annotated with a small key symbol.

As shown, an ASSET_TYPE table 601 is used to monitor the relevant asset types from the data repositories and based on the user configuration. Every asset type in the table may be used to build a new data mart in which all the facts and dimensions relevant to that asset type will be captured. The NAME field of the ASSET_TYPE table 601 is used as the name for the data mart.

An ASSETS table 602 is used to store the actual information assets. Information assets are of a certain type and are therefore qualified by a type identifier in the ASSET_TYPE table 601. The list of attributes needed to represent an information asset is not fixed. That is, the ASSETS table 602 may include fields like NAME, SHORT_DESC, and so forth.

Information assets may be part of a hierarchy represented through the ASSET_GROUP_MEMBERS table 603. Every asset identified by its ASSET_ID may be the child of another asset identified by the PARENT_ASSET_ID. Both foreign-keys are references to the same ASSET_ID primary-key in the ASSETS table 602. Every such parent-child association may be described by other attributes, e.g., a GROUP_DESC and a HIER_LVL_ID in the ASSET_GROUP_MEMBERS table 603. The HIER_LVL_ID is used to identify the tree level at which the parent-child association exists (i.e., how far below the root level the child lives in the tree).

Information assets may also have associations to other information assets that are not parent-child associations. Those associations are represented via the ASSET_REFERENCES table 604. Once again, two foreign-keys refer back to the ASSETS table 602. Optionally, one may again assign other attributes to these associations, such as to describe or to name the association.

The MEAS_RUN table 605 is used to allow versioning of the records in the intermediate data warehouse. Each information asset, along with all its attributes, measures, and associations, will be assigned a timestamp identified by a unique MEAS_ID. The actual timestamp is stored in attributes such as MEAS_RUN_TMS or MEAS_EXE_TMS. Further, the actual timestamp may represent times such as creation time, update time, or last time we observed an asset. The MEAS_ID is referenced as a foreign-key by tables that include the ASSET_GROUP_MEMBERS table 603 and the ASSET_REFERENCES table 604. This enables the preservation of a complete history of all data relevant to assets. For example, parent-child associations and other associations that once existed will be preserved.

In addition to capturing associations between information assets, facts about information assets are captured. These facts (or measures) again have a type and a value. The type is stored in the MEAS_TYPE table 606 and may have a list of optional attributes to describe or to name the type. A specific measure type is relevant only to a specific information asset type. As shown, the MEAS_TYPE table 606 has a foreign-key association with the ASSET_TYPE table 601.

The actual fact (or measure) is represented as a record in the MEASURES table 607 and uses three references. A measure has a specific type (reference to MEAS_TYPE_ID), is for a specific information asset (reference to ASSET_ID), and is valid at a given time (reference to MEAS_ID). The fact itself may be represented in various formats, such as string, boolean, numeric, etc. Optionally, one may create more fine-grained format representations. For example, one may distinguish between numeric types of integer and double.

Figure 7:
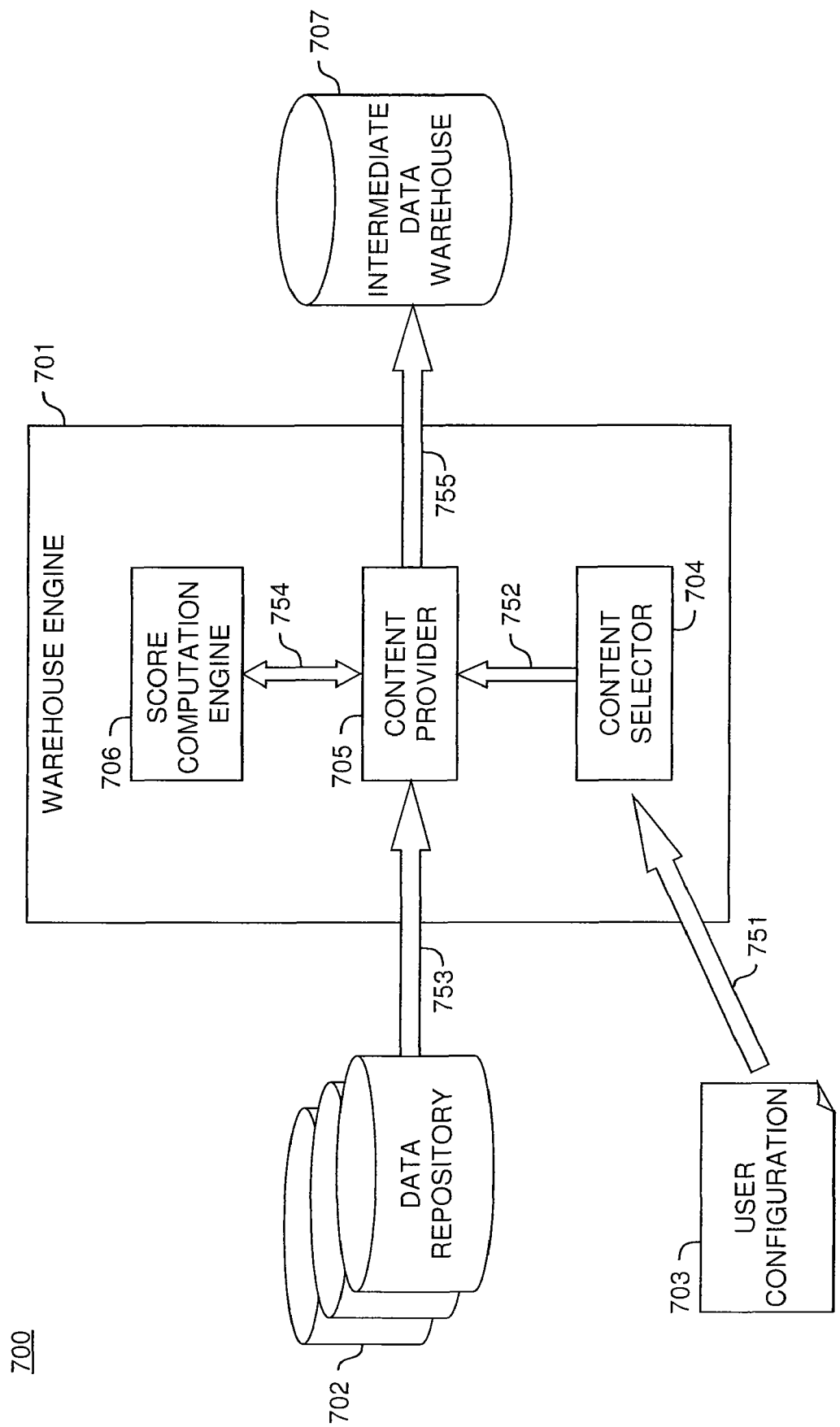
FIG. 7 is a block diagram illustrating an architecture for populating the intermediate data warehouse, according to one embodiment of the invention.

In one embodiment of the invention, once the schema for the intermediate data warehouse is defined, an architecture is provided for populating the intermediate data warehouse. FIG. 7 is a block diagram illustrating an architecture 700 used to populate the intermediate data warehouse, according to one embodiment of the invention. In FIG. 7, arrows represent control flow and illustrate how components interact with one another.

In Figure, a warehouse engine 701 receives a user configuration 703 and populates an intermediate data warehouse 707 using data from data repositories 702. Illustratively, the warehouse engine 701 includes a content selector 704, a content provider 705, and a score computation engine 706.

A control flow 751 exists from a user configuration 703 to the content selector 704. Illustratively, the user configuration 703 is provided to the content selector 704, which determines the acceptable format of the user configuration 703. The content selector 704 receives the configuration and optionally parses it to retrieve relevant elements. In one embodiment of the invention, the configuration at a minimum includes a list of repositories, asset types, associations, and measure elements. Every element has a name and a number of attributes. For example, in the case of an element containing a query attribute, a corresponding value for the query attribute must be provided in the syntax applicable to the data repository API so that the query may be passed directly to the data repository for processing.

A control flow 752 exists from the content selector 704 to the content provider 705. The content provider 705 receives the elements from the content selector 704 and provides data to the score computation engine 706 and the intermediate data warehouse 755. The content provider 705 controls the data in three ways, according to one embodiment. These mechanisms are described in further detail in conjunction with FIG. 8 below. First, the content provider 705 controls how the data is retrieved from the data repositories 702. Second, the content provider 705 controls how data is computed in the score computation engine 706. Third, the content provider 705 controls how the data is written to the intermediate data warehouse 707.

A control flow 753 exists from the data repositories 702 to the content provider 705. For elements with a query attribute, the content provider 705 issues the query directly to the data repository 702. The user configuration 703 specifies the types of data repositories and the necessary connection information to the data repositories 702.

In the illustrative embodiment, a bidirectional control flow 754 exists between the content provider 705 and the score computation engine 706. Optionally, there may be elements in the user configuration that require processing, i.e., require more than merely querying the data repository. An example is score computations. A score may be either a base score or a composite score. A value for a base score is computed directly from a measure retrieved through the content provider 705 and using an algorithm implemented in the score computation engine 706. A value for a composite score is computed from a list of base scores using an algorithm implemented in the score computation engine 706. Those skilled in the art will recognize, for example, that the architecture 700 could easily be extended to include other processing engines other than a score computation engine 706.

A control flow 755 also exists between the content provider 705 and the intermediate data warehouse 707. Illustratively, data retrieved from the data repositories 702 or computed in the score computation engine 706 is written to the data warehouse 707 by the content provider 705. The content provider 705 terminates when all the elements specified by the content selector 704 have been processed.

Figure 8:
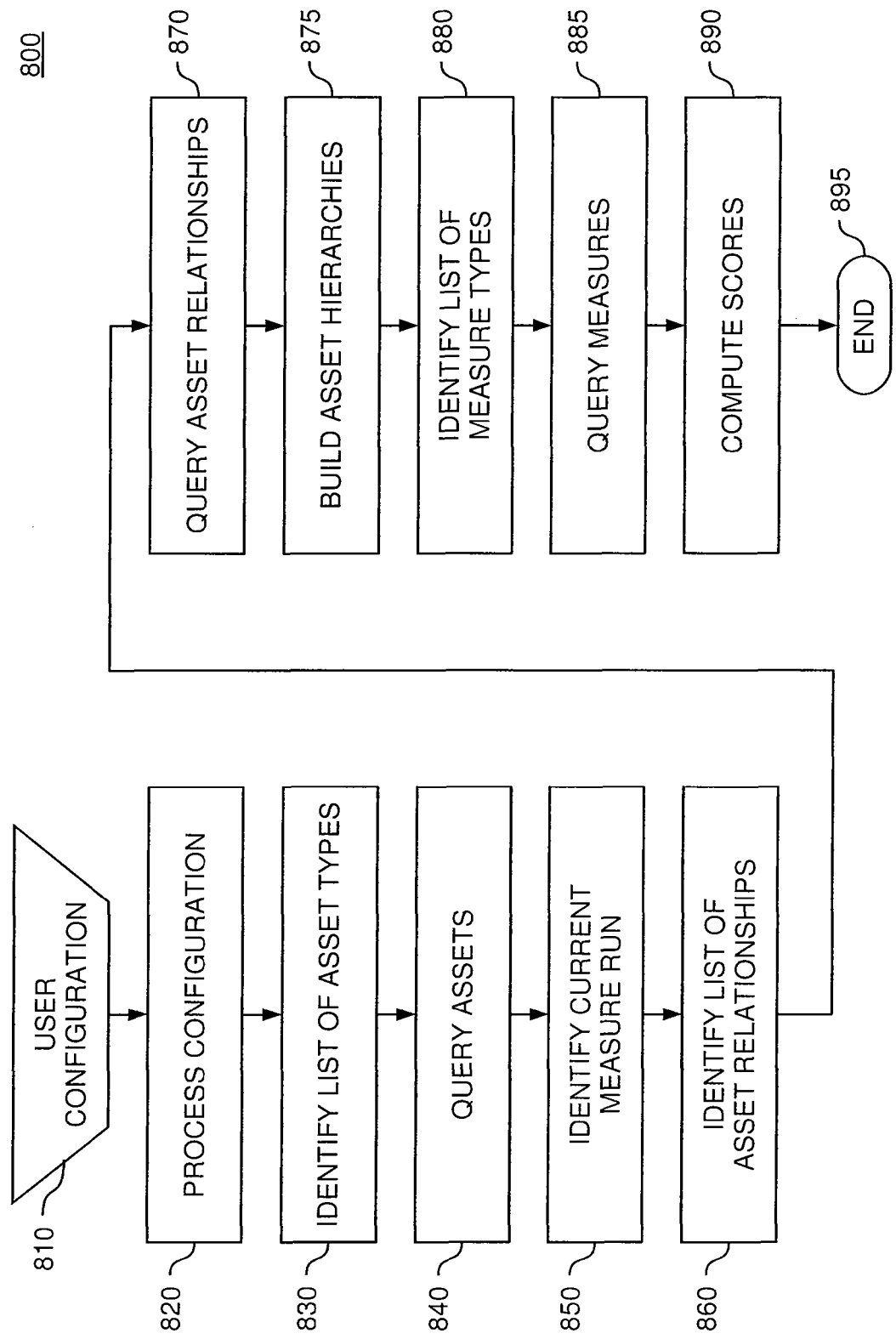
FIG. 8 is a flow diagram illustrating a flow for populating the intermediate data warehouse, according to one embodiment of the invention.

Referring now to FIG. 8, a flow diagram is shown illustrating a method 800 for populating the intermediate data warehouse using the architecture 700, according to one embodiment of the invention. As shown, method 800 begins at step 810, where a user configuration is used as input to the warehouse engine flow. At step 820, the user configuration is processed to retrieve the elements with all relevant attributes. Depending on the format of the user configuration, the processing step could either require an XML parser for XML formatted configurations, a query engine for relational table configurations, or any other processing suitable for the format of the user configuration.

At step 830, asset types are provided in the user configuration and are inserted into the warehouse with a name and a uniquely generated ASSET_TYPE_ID in the ASSET_TYPE table 601. Optionally, other attributes may also be inserted into the table. Examples include a query that retrieves all the attributes of an asset of a given type (XQUERY_ATTRIBUTE) and a query that retrieves associations to assets of other asset types (XQUERY_ASSOCIATION).

At step 840, the list of asset types is processed, and for each asset type, a query is executed to retrieve the assets into the ASSETS table 602. Each asset is uniquely identified by its ASSET_TYPE_ID and a generated ASSET_ID. The inserted attributes for an asset are limited to its name (NAME) and a short description (SHORT_DESC) in a preferred embodiment. Additional attributes are processed later as measures in step 890.

At step 850, before the remaining tables are processed, a unique identifier is generated to identify the current execution run. This identifier is called MEAS_ID and is written to MEAS_RUN table 605 in the intermediate data warehouse. The MEAS_ID is later referenced by all remaining tables in the intermediate data warehouse schema. The MEAS_ID provides the timestamp of the current execution run as MEAS_RUN_TMS. The MEAS_ID may be as simple as having a counter set to [max(MEAS_ID)+1] or may encode the current system time in a certain manner. The only requirements for MEAS_ID are for MEAS_ID to be unique and be sorted in ascending order.

Constructing the MEAS_RUN table enables the versioning of records in the intermediate data warehouse, thereby allowing the capture of data changes in the data repositories. Such data includes facts (attributes, measures, complex measures) of an asset as well as the associations of an asset. Illustratively, an asset may be created and thereafter exist in a data repository at one point in time, but may be removed again at a later point in time. Such a change may be captured via the MEAS_ID, which is used to identify the timestamp when data was extracted from the data repository.

At step 860, associations between assets are provided in the user configuration as elements of an asset type. The association element has a query attribute where the query returns the identifier of the asset and the identifier of the referenced asset. An association is a uni-directional association, where the asset of one asset type references an asset of another asset type. Bi-directional associations are represented with two queries in the user configuration: one for asset type A referencing an asset of type B and one for asset type B referencing an asset of type A. Additionally, asset references may also exist between assets of the same type.

At step 870, the asset and the referenced asset already exist in the data warehouse. The association between the asset and the referenced asset is stored as a tuple consisting of ASSET_ID and ASSET_REF in ASSET_REFERENCES table 604. Both identifiers are foreign keys to the ASSETS table 602. In other words, ASSET_ID and ASSET_REF must reference existing assets. All discovered associations are valid with respect to the current measure run and the unique key in the ASSET_REFERENCES table 604 is formed as the triplet: (MEAS_ID, ASSET_ID, ASSET_REF).

At step 875, asset hierarchies are built using a set of recursive queries on the ASSET_REFERENCES table 604. For every asset referenced by the ASSET_ID, the algorithm returns the ASSET_REF and assigns ASSET_REF to be the new ASSET_ID. The recursion stops when no more tuples are returned. Then, the method 800 recursively retraces the found ASSET_REF and ASSET_ID tuples and writes them into the ASSET_GROUP_MEMBERS table 603. The ASSET_REF will be stored as the PARENT_ASSET_ID of the ASSET_GROUP_MEMBERS table 603. In addition, the ASSET_ID will be stored as the ASSET_ID of the ASSET_GROUP_MEMBERS table 603. The HIER_LVL_ID is generated starting with 0 and is incremented for every tuple. Every hierarchy discovered this way is valid with respect to the current measure run. Further, the unique key in the ASSET_GROUP_MEMBERS table 603 is formed as the triplet: (MEAS_ID, ASSET_ID, PARENT_ASSET_ID).

At step 880, measure types that were specified in the user configuration for every asset type are inserted into the warehouse with a name, a unique identifier, and type information for the actual data values expected for the particular measure type. The MEAS_TYPE table 606 is used to store the set of measures for every ASSET_TYPE_ID and to uniquely identify each measure through the ASSET_TYPE_ID and a generated MEAS_TYPE_ID. The mandatory TYPE attribute is used to identify whether the data should be consumed as strings, numerics, or any other data type. Optionally, other attributes may also be inserted into the table. Examples include an attribute representing the maximum length of every data value (LENGTH) and an attribute representing the query used to retrieve the data value (XQUERY).

At step 885, for every simple measure type inserted into the MEAS_TYPE table 606, the method 800 then queries the actual values from the data repository and stores it as a tuple in the MEASURES table 607. The actual value may be a STRING_VALUE, NUMERIC_VALUE, or BOOLEAN_VALUE, based on the data type specified for the particular measure type. The actual value is uniquely identified for a particular measure run, a particular asset, and a particular measure type. Further, the primary key for the MEASURES table 607 is formed as the triplet: (MEAS_ID, ASSET_ID, MEAS_TYPE_ID).

At step 890, for every complex measure type inserted into the MEAS_TYPE table 606, the method 800 computes the measure values using the attributes provided in the user configuration. One attribute identifies the input measure and another attribute identifies the algorithm used to compute the complex measure. At this step, input measure and the algorithm should both already exist for the computation to proceed. In other words, an algorithm is implemented in the score computation engine 706 and the input measure values are available in the MEASURES table 607, where the input measure values have the current MEAS_ID. For a composite complex measure, the method 800 computes the measure value using a list of input measures which include simple measures, complex measures, composite complex measures, or some combination thereof. Once again, the measure value may be computed again with an existing algorithm and an existing set of input values. The result of every computation is stored in the MEASURES table 607 with a unique key consisting of the triplet: (MEAS_TYPE_ID, the MEAS_ID, and the ASSET_ID). After step 890, the method 800 terminates.

Figure 9:
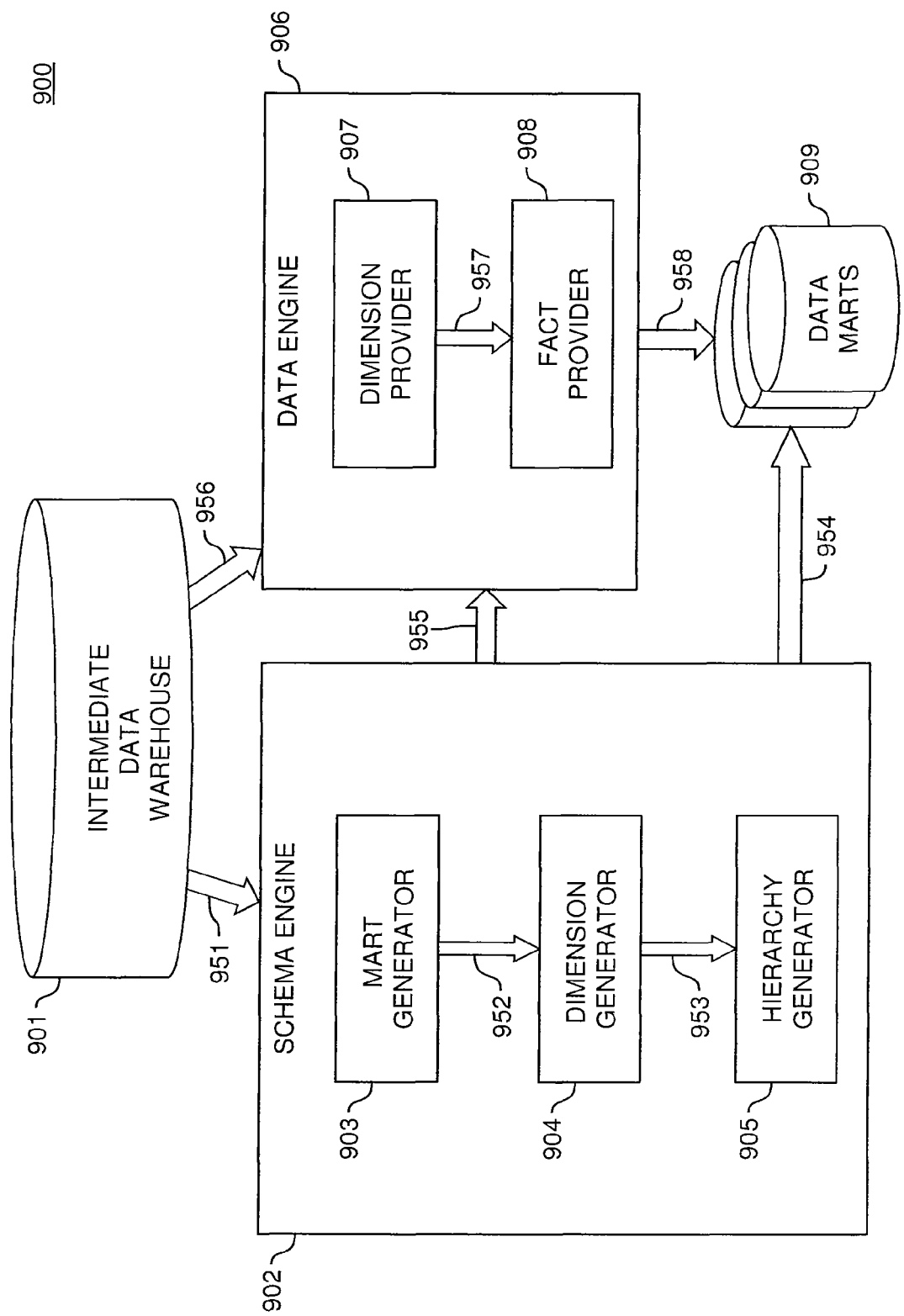
FIG. 9 is a block diagram illustrating an architecture for creating and populating the data marts, according to one embodiment of the invention.

In one embodiment of the invention, once the intermediate data warehouse is populated, an architecture is provided for creating and populating data marts. FIG. 9 is a block diagram illustrating an architecture 900 used to create and populate the data marts, according to one embodiment of the invention. In FIG. 9, arrows represent control flow and illustrate how components interact with one another.

In FIG. 9, a schema engine 902 generates schemas for data marts 909 by querying an intermediate data warehouse 901. A data engine populates the data marts 909 by querying the intermediate data warehouse 901. The schema engine 902 includes a mart generator 903, a dimension generator 904, and a hierarchy generator 905. The data engine 906 includes a dimension provider 907 and a fact provider 908.

The architecture 900 queries the data in the intermediate data warehouse 901 to generate and populate one or more data marts 909. Each data mart will have a dynamically generated schema, but will have a common structure. An example of a data mart schema may be found in FIG. 11 described below. An explanation of the common structure of data marts is also provided below.

A control flow 951 exists from the intermediate data warehouse 901 to the schema engine 902. The schema engine 902 is used to define snowflake schemas for the data marts. The schema engine 902 queries the data in the intermediate data warehouse 901 to determine the number, type, and names of data marts to generate. Each data mart 909 is then generated with a single master fact table using the mart generator 903. The definition for the master fact table and the logic to create the master fact table are implemented in the mart generator 903.

A control flow 952 exists from the mart generator 903 and the dimension generator 904. In this flow, a set of dimensions are built for each data mart 909 using the dimension generator 904. The number, types, and names for the dimensions are generated by querying the data in the data warehouse 901, and may vary from data mart to data mart. Three common dimensions are added to every data mart to capture information about time, measures, and attributes. In other embodiments of the invention, however, the common dimension for attributes is optional and may not be included in a data mart.

A control flow 953 exists from the dimension generator 904 to the hierarchy generator 905. In this flow, every dimension constructed by the dimension generator 904 will be assigned a hierarchy using the hierarchy generator 905. The hierarchy for every dimension is also generated by querying the data in the intermediate data warehouse 901. Each hierarchy consists of a set of tables linked together through referential constraints. The number and names of tables vary from dimension to dimension and from data mart to data mart. Finally, the bottom table in a hierarchy is linked to the master fact table. The definition of each table, the logic for creating each table, and the logic for linking the tables together are implemented in the hierarchy generator 905.

A control flow 954 exists from the schema engine 902 to the data marts 909. In this flow, the set of snowflake schemas defined and constructed by the schema engine 902 are persisted into one or more databases. If persisted into a single database, the data marts 909 may be stored in different schemas or namespaces to avoid duplicate name conflicts for tables with common names across multiple snowflake schemas.

A control flow 955 exists from the schema engine 902 to the data engine 906. In this flow, the set of data marts 909 is populated using the data engine 906. Without loss of generality, an assumption may be made that the data marts 909 have not been populated yet and that a full insert is necessary. However, if a data mart has already been populated, the data engine 906 may be used to re-populate or update the data mart, thereby also omitting flow 954 above.

A control flow 956 exists from the intermediate data warehouse 901 to the data engine 906. In this flow, the data engine 906 is used to populate the data marts 909. The data engine 906 queries the data in the intermediate data warehouse 901 and attempts to insert data into all the tables in the data marts 909, including the master fact table and every table in every hierarchy for each dimension of the respective data mart.

A control flow 957 exists from the dimension provider 907 to the fact provider 908. In this flow, the data needed to populate every dimension is obtained from the intermediate data warehouse 901 and queried in the dimension provider 907. By iterating through the list of dimensions and the set of tables in every dimension, the dimension provider 907 populates every table in the hierarchy for every dimension of the respective data mart.

A control flow 958 exists from the data engine 906 to the data marts 909. In this flow, the fact provider 908 queries the intermediate data warehouse 901 to obtain the data for every data mart 909 and populates the master fact table of each data mart 909 with the data. For each data mart 909, the fact provider 908 also populates the foreign key columns used to link the fact table with the dimensions populated in the dimension provider 907. All the data constructed by the dimension provider 907 and by the fact provider 908 is inserted and committed into the data marts 909 generated by the schema engine 902.

Figure 10:
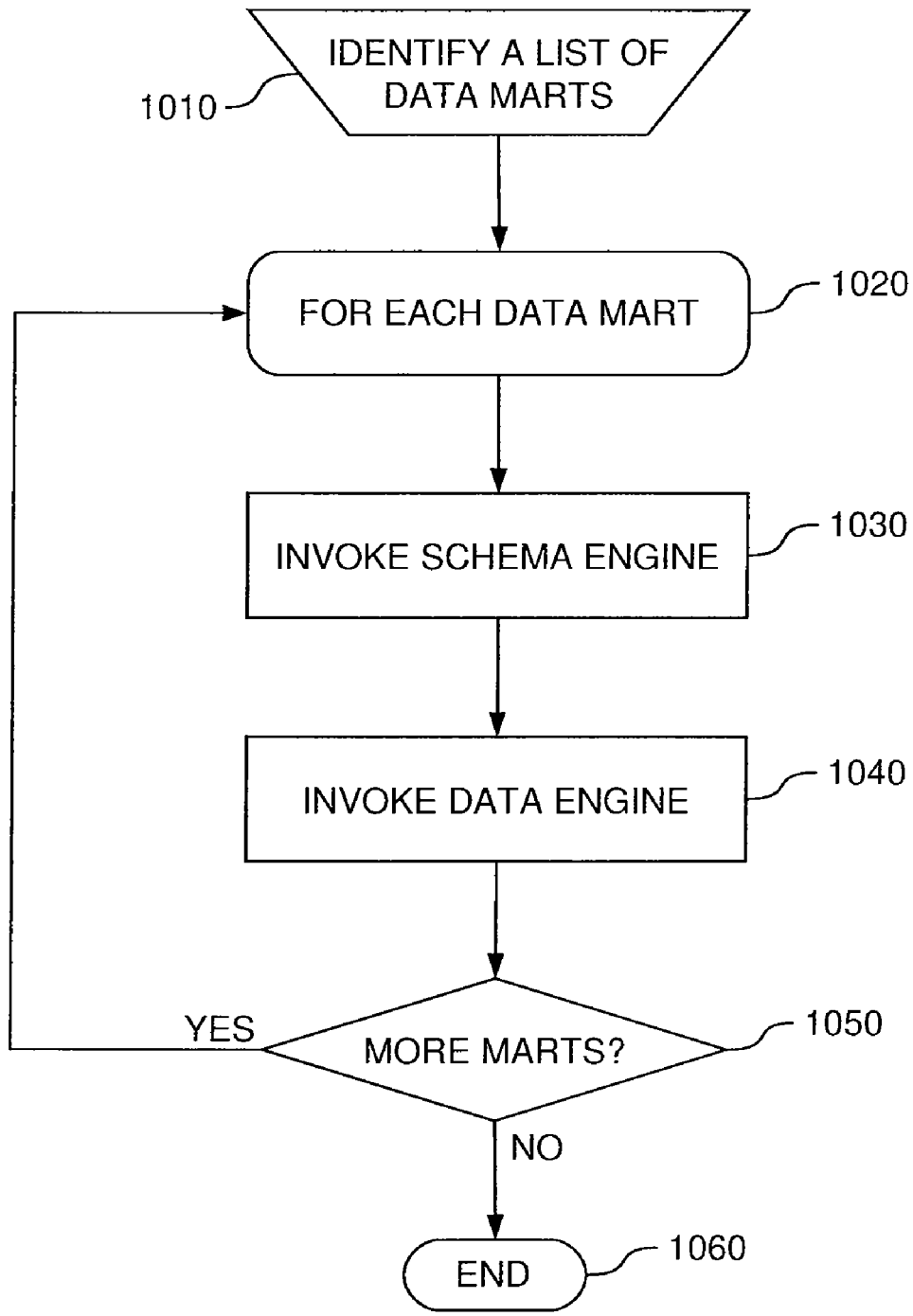
FIG. 10 is a flow diagram illustrating a high-level overview to create and populate the data marts, according to one embodiment of the invention.

FIG. 10 is a flow diagram illustrating a method 1000 to create and populate the data marts using the architecture 900, according to one embodiment of the invention. For purposes of illustration, the intermediate data warehouse schema in FIG. 6 is used as input.

As shown, method 1000 begins at step 1010, where the user identifies a list of data marts by asset type. The asset type of each data mart should match a type listed in the ASSET_TYPE table 601. At step 1020, for the list of data marts with an existing type in the ASSET_TYPE table 601, method 1000 iterates through a main loop, identifying a data mart with an asset type identifier. At step 1030 of the main loop, a data mart schema is created for the data mart identified by its asset type identifier. In one embodiment, step 1030 is carried out by the schema engine 902 described above with respect to FIG. 9. Further, all of the tables created for the data mart are persisted into a database.

At step 1040 of the main loop, the tables are populated with data using the schema defined in step 1030 and the tables created in step 1030. In one embodiment, step 1040 is carried out by the data engine 906 described above with respect to FIG. 9. At step 1050 of the main loop, if more data marts exist in the list of data marts, the method 1000 loops back to step 1020 to process the next data mart identified by the asset type identifier. After step 1050, when all the data marts of the list of data marts have been processed, the method 1000 terminates.

To aid in the understanding of FIGS. 11-12, FIGS. 13A-C will be described first. FIGS. 13A-C are block diagrams illustrating an example of a generated data mart schema, according to one embodiment of the invention. In particular, the data mart schema is illustrative of a schema that may be generated according to the method 1000 described above with respect to FIG. 10. Illustratively, generated data mart schemas can vary in at least the following respects: (i) the number of arms in the schema (dimensions); (ii) the number of tables in the arms (hierarchies); (iii) the names of the tables (dimension types); and (iv) the list of columns in the tables (attributes).

A FACT table 1301 (of FIG. 13A) is a master fact table of the data mart. Each data mart schema includes a single master fact table. Each record in the FACT table 1301 is uniquely identified by a triplet that includes: ASSET_ID (the asset identifier), TIME_ID (the time identifier), and MEAS_TYPE_ID (the measure type identifier). Values are stored in a list of columns of different data types. For example, NUMERIC_VALUE could be a column for storing double, integer, and decimal measures, and STRING_VALUE could be a varchar column for storing char and varchar measures. Further, the list of columns could be extended to store measures of other types, such as datetime or blob.

A dynamic dimension 1302 (of FIG. 13C) of the data mart is named USER_DEFINED_TERM. The dynamic dimensions of one data mart may differ from those of another data mart. The name of the data mart, USER_DEFINED_TERM, is used to prefix each table in the hierarchy of the dynamic dimension 1302. Other dynamic dimensions of the data mart are QUALITY_RULESET (of FIG. 13C) and PHYSICAL_LAYOUT_TABLE (of FIG. 13B). The number and names of the dynamic dimensions varies across data marts of different types.

A hierarchy of tables 1303 (of FIG. 13C) is unique to the USER_DEFINED_TERM dimension 1302 of the data mart. The number and names of tables in a hierarchy are generated dynamically. The tables of the hierarchy of tables 1303 are linked according to their level within the hierarchy. Although one hierarchy per dimension is shown in the figure, multiple hierarchies may be supported by a single dimension in other embodiments of the invention.

A table USER_DEFINED_TERM_LVL_0_CATEGORY 1304 (of FIG. 13C) has been generated dynamically and is unique within the USER_DEFINED_TERM hierarchy 1303. The definition of the table, however, is limited and other definitions are contemplated. Each table has the following three keys: ASSET_ID to store the unique asset identifier, TIME_ID to store the time identifier, and PARENT_ASSET_ID to store the parent asset identifier. The two attributes NAME and SHORT_DESC are used to store the name and short description of an asset respectively and may easily be extended. The name of the table 1304 includes the name of the dimension, the level identifier, and the type of the table.

A FACT_TERM table 1305 (of FIG. 13A) is the multiple fact table used for the USER_DEFINED_TERM dimension 1302. Every dynamic dimension has a multiple fact table. The multiple fact tables of the example include FACT_TERM, FACT_RULESET, and FACT_TABLE (of FIG. 13C). Each multiple fact table has a fixed definition and contains keys ASSET_ID, TIME_ID, and MEAS_TYPE_ID to uniquely identify each fact in the master fact table. Further, each multiple fact table contains fields REF_ID and TIME_ID to uniquely identify the referenced asset in the hierarchy.

Three static dimensions 1306 (of FIG. 13A) exist in every data mart. In other embodiments of the invention, however, the static dimension of attributes is optional. As shown, all three static dimensions have flat hierarchies, with only one table per hierarchy. In the example, the table definitions for the time and measure type hierarchies are fixed. The table definition for the attributes hierarchy is variable and is dynamically generated. The TIME_LVL__0_TIMESTAMP table is linked with the FACT table 1301 using the TIME_ID field. The MEASURE_TYPE_LVL__0_NAME table is linked with the FACT table 1301 using the MEASTYPE_ID field.

The ATTRIBUTES_LVL__0_NAME table 1307 (of FIG. 13A) has been dynamically generated so that its definition is unique to the data mart. The table uses a fixed composite key the ASSET_ID and TIME_ID fields to reference records in the FACT table 1301. The list of attributes, however, is variable. The list of attributes depends on the type of data mart. As shown, ISVIEW is an example of an attribute in the list of attributes.

Figure 11:
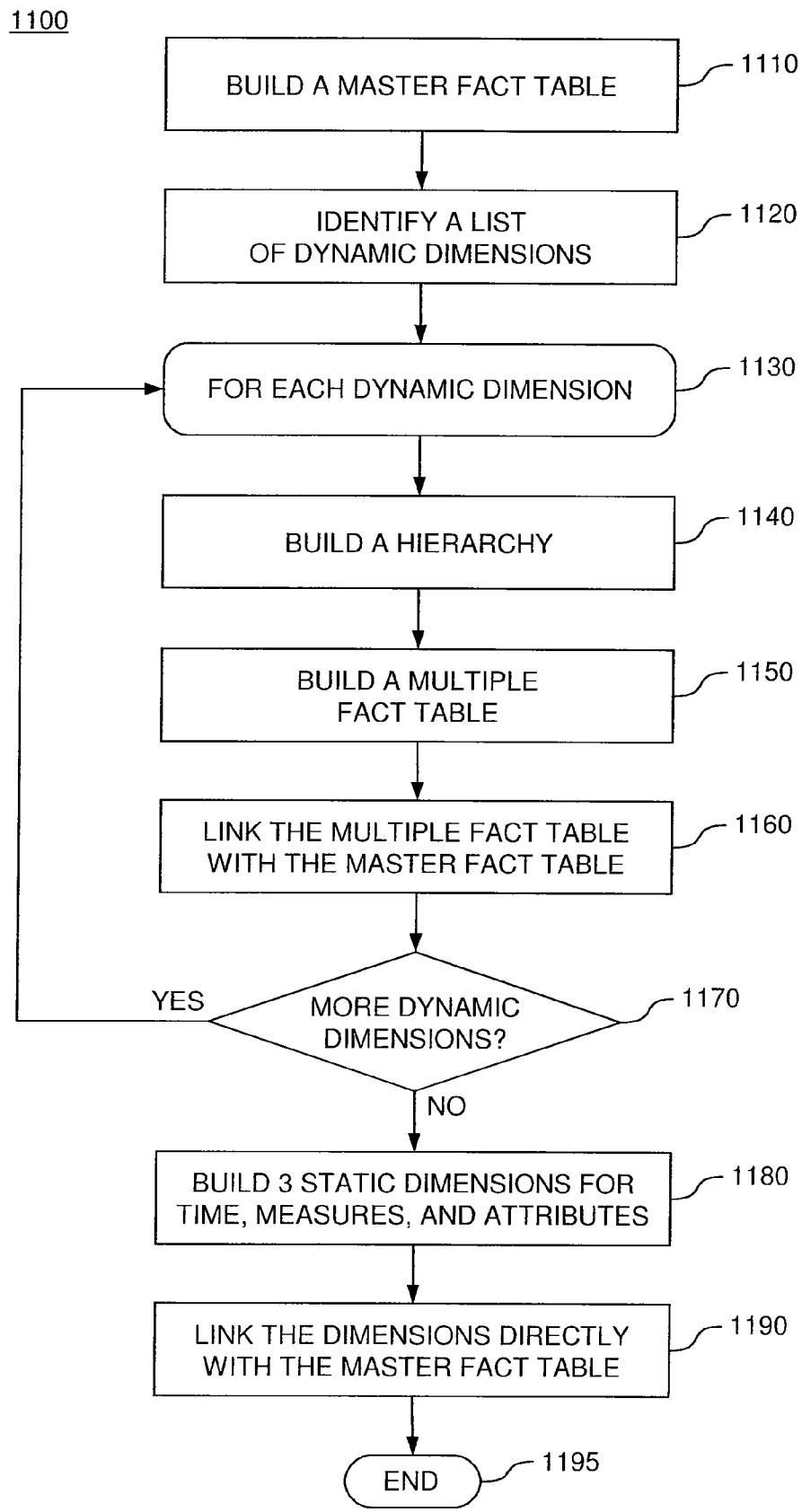
FIG. 11 is a flow diagram illustrating a flow for creating snowflake schemas for data marts, according to one embodiment of the invention.

Referring now to FIG. 11, an embodiment of a flow diagram illustrating a method 1100 for creating snowflake schemas for data marts is shown. In particular, the method 1100 illustrates one embodiment of step 1030 of FIG. 10, carried out by the schema engine 902. As shown, method 1100 begins at step 1110, where a snowflake schema is created beginning with its master fact table. The table definition for the fact table is fixed and identical across all data marts so that the fact table may be consumed more easily by downstream applications. The list of attributes for the fact table may be generated based on application needs, but should contain at least four foreign keys. Three of the foreign keys are needed to reference static dimensions created in step 1180 for time, measures, and attributes. One foreign key is needed to reference all dynamic dimensions created in steps 1130 to 1170. The fact table created here is referred to as the master fact table to distinguish it from other fact tables (i.e., multiple fact tables) to be created in step 1150.

At step 1120, the number and type of dimensions varies across data marts. Dynamic dimensions, which have a variable definition, are distinguished from static dimensions, which have a fixed definition. Dynamic dimensions are generated in steps 1120 to 1170. Static dimensions are generated in steps 1180 and 1190. To identify the list of dynamic dimensions for this particular data mart, the method 1100 queries the ASSET_TYPE 601, ASSETS 602, ASSET_GROUP_MEMBERS 603, and ASSET_REFERENCES 604 tables in the intermediate data warehouse. First, the method 1100 lists all assets that are related to or referenced by any asset of type t1 where t1 is the asset type used to identify this particular data mart. Then, the method 1100 extracts a distinct list of all asset types associated to those assets. Finally, t1 itself is added to the distinct list of asset types.

At step 1130, for each dynamic dimension listed in step 1120, the method 1100: (i) generates a hierarchy, (ii) adds a fact table to the hierarchy, and (iii) links the fact table with the master fact table. Because of the nature of the fact tables, the dimension-specific fact tables are referred to as multiple fact tables.

At step 1140, a hierarchy is constructed bottom-up in two steps. In the first step, the bottom (leaf level) of the hierarchy is identified. In the second step, the higher levels (up to the root level) are generated. Alternatively, the hierarchy could also be generated using a top-down approach. Either approach requires a recursive algorithm to generate the variable number of levels between the leaf level and the root level of the hierarchy.

To generate the leaf level of the hierarchy, the method 1100 queries the ASSET_GROUP_MEMBERS table 603 to find an asset that is a candidate for the lowest level of the hierarchy. The asset is of the same type as the dimension and has the highest possible value for its level identifier. Using the chosen candidate, a leaf level table is generated that is identified by the type of the dimension and the level of the candidate. The list of attributes for this table is again fixed and identical throughout all levels of a hierarchy so that the hierarchy may be consumed more easily by downstream applications. The table includes at least one primary key to uniquely identify the asset and one foreign key to identify a parent asset in the next level table.

After the leaf level table has been created, a recursive algorithm generates the remaining tables up to the root level of the hierarchy. The parent-child associations captured in the ASSET_GROUP_MEMBERS table 603 are traversed beginning with the candidate asset up to the parent asset that has a level identifier of 0 and no further parent. For every step in the recursion, a table is generated that is again identified by the name of the dimension and the level identifier. The table is linked to the underlying table in the hierarchy using a primary-key/foreign-key reference between the asset id column and the parent asset id column.

At step 1150, the hierarchy is completed by adding a multiple fact table as a link between the hierarchy and the master fact table. The multiple fact table has a fixed list of attributes but should contain at least: (i) one foreign key to the unique asset identifier in the leaf table of the hierarchy and (ii) one foreign key to the unique asset identifier in the master fact table. The multiple fact table itself is identified only by the name of the dimension.

At step 1160, the multiple fact table is linked with: (i) the master fact table and (ii) with the leaf level table of the hierarchy by means of the two foreign keys created in the multiple fact table.

At step 1170, if there are more dynamic dimensions to be processed as identified in the list created in 1120, the method 1100 loops back to step 1130.

At step 1180, after all dynamic dimensions have been processed, three static dimensions are generated. These three static dimensions capture information about time, measure types, and attributes. Each static dimension has a simple hierarchy consisting of only one table. Further, each static dimension does not require a multiple fact table. The time and measures dimension tables have a fixed (but not necessarily the same) list of attributes. A primary key may be used to link the static dimensions with the master fact table.

In other embodiments of the invention, however, the static dimension representing attributes is optional. Attributes of an asset are values of type string, boolean, or timestamp, which may not be aggregated. Depending on the consuming downstream applications, the values may or may not be needed in the form of a de-normalized table to be directly consumed by querying the columns of the de-normalized table. The attributes dimension is the dimension that provides a flat table with columns for every attribute of a non-numeric type. If the consuming application is able to treat attributes in the same way as measures, then the static dimension representing attributes is not needed.

If the static dimension representing attributes is needed, an attributes dimension table is generated that has a list of dynamically constructed attributes. To generate the attributes dimension table, the method 1100 queries the MEAS_TYPE table 606 in the intermediate data warehouse and extracts all measure types that are not numeric, creating one column for each. A unique key column is added to link the attributes dimension with the master fact table.

At step 1190, the two (or three) static dimensions are linked with the master fact table using the foreign keys created in the master fact table and the primary keys created in the static dimension tables. After step 1190, after all tables have been generated, the method 1100 terminates.

Figure 12:
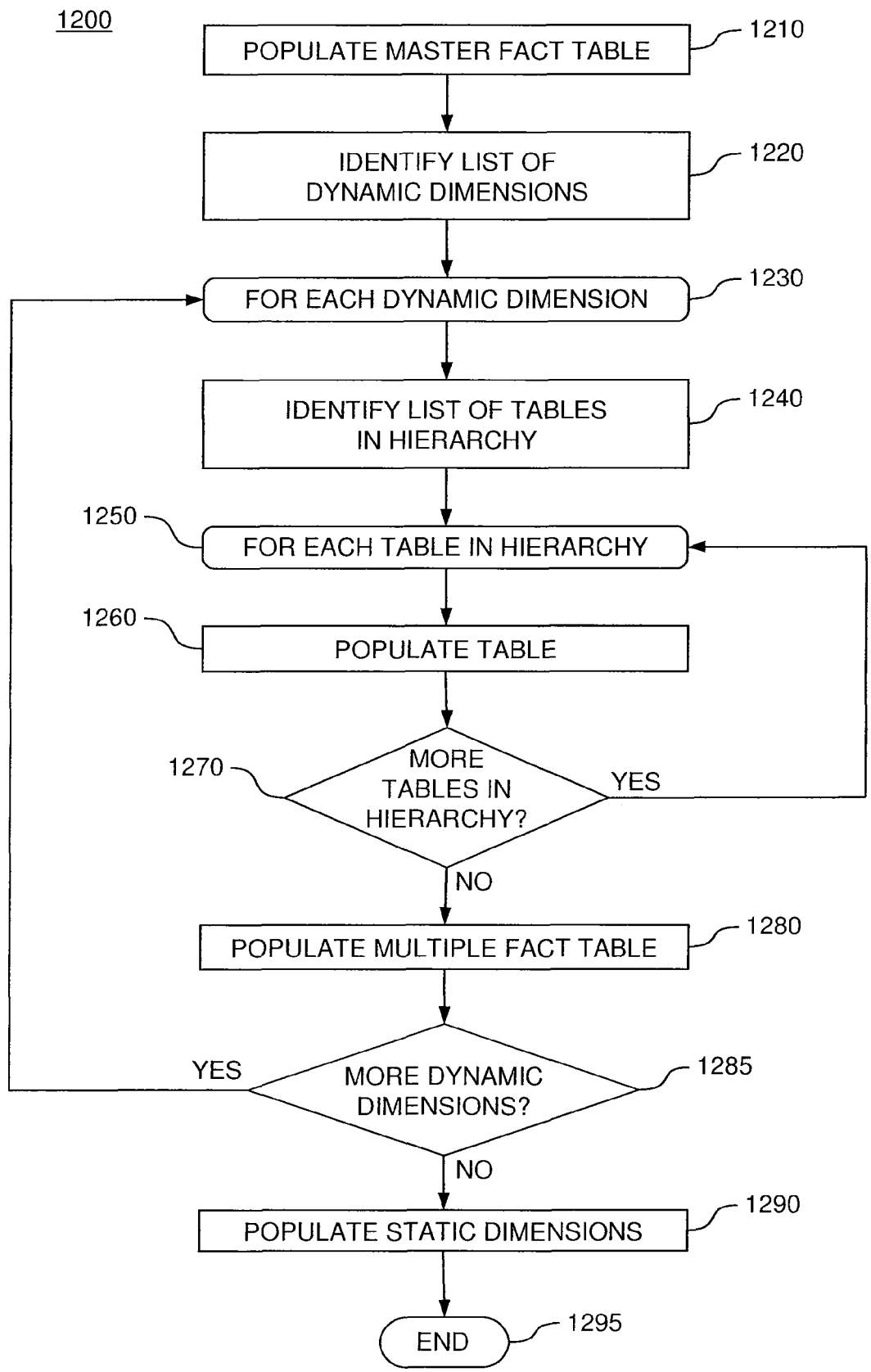
FIG. 12 is a flow diagram illustrating a flow for populating data marts, according to one embodiment of the invention.
Figure 13A:
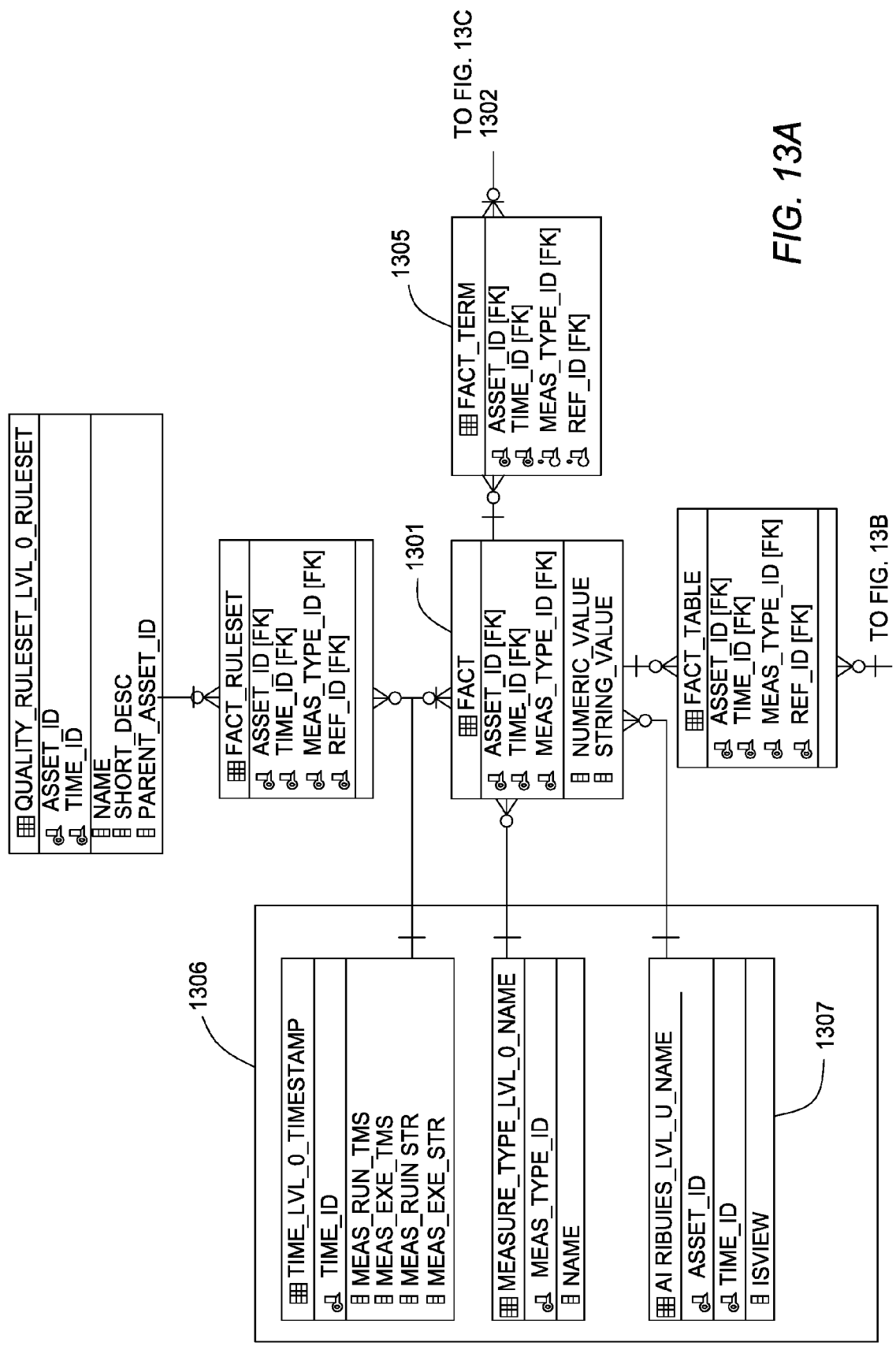
FIGS. 13A-C are block diagrams illustrating an example data mart schema, according to one embodiment of the invention.
Figure 13B:
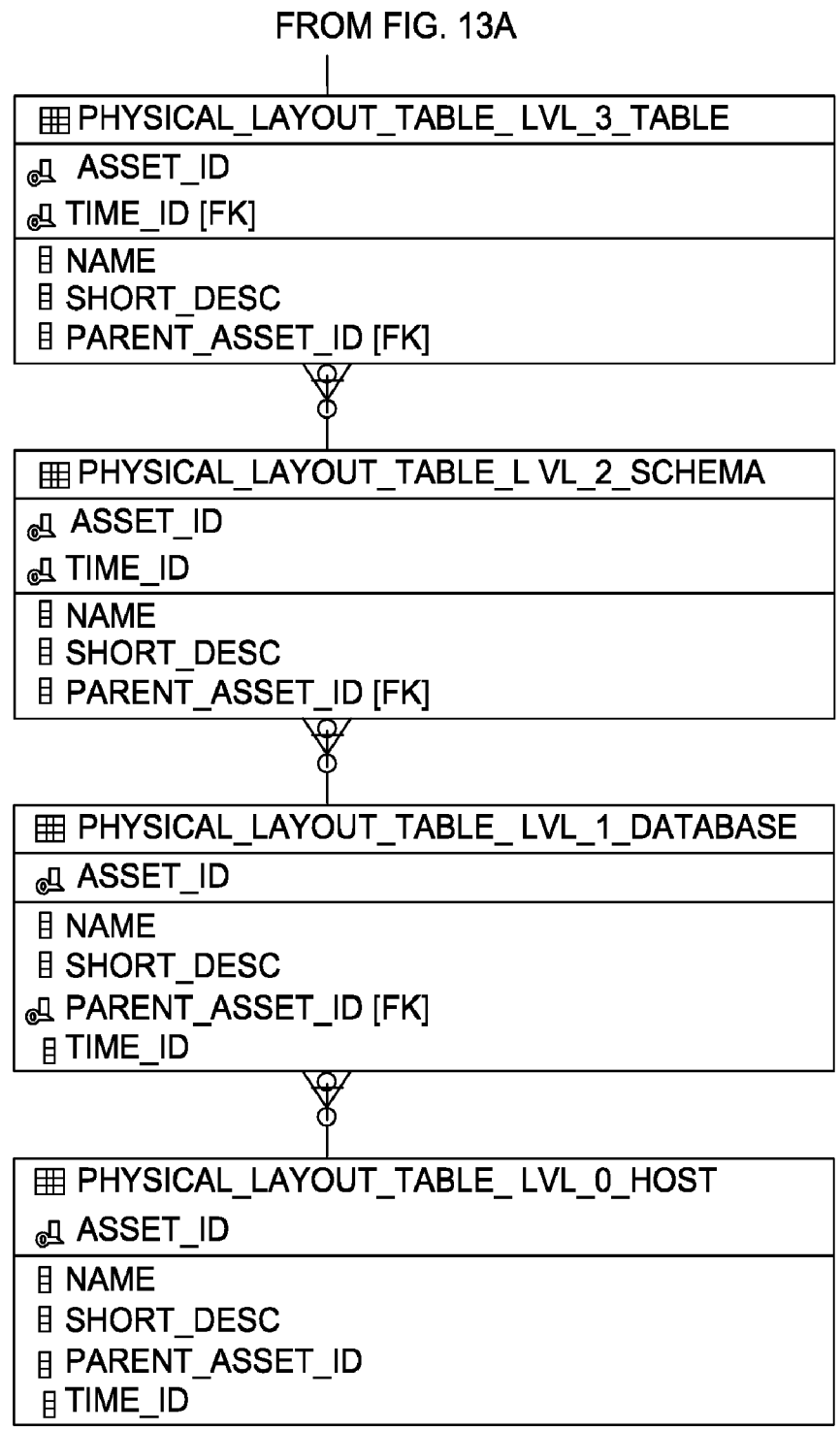
Figure 13C:
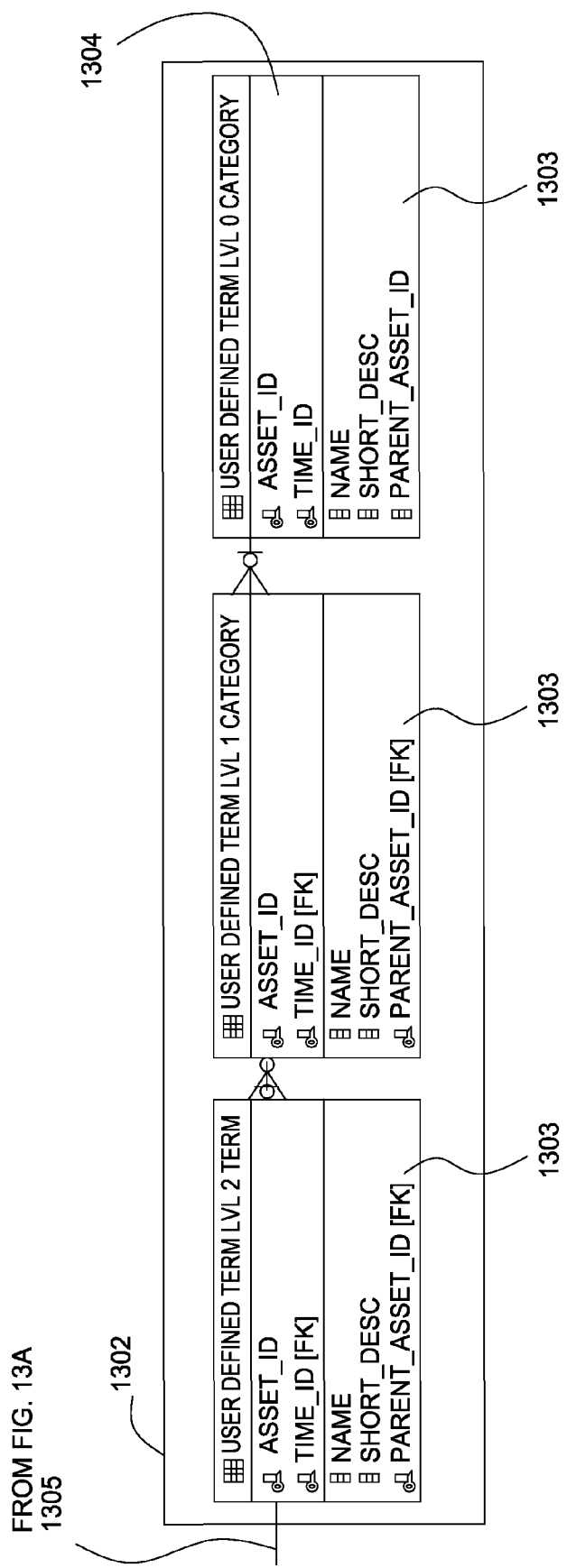

Referring now to FIG. 12, a flow diagram is shown illustrating a method 1200 to populate data marts, according to one embodiment of the invention. In particular, the method 1200 illustrates one embodiment of step 1040 of FIG. 10, carried out by the data engine 906. As shown, method 1200 begins at step 1210, where the master fact table for the data mart is populated. Each data mart is created for a specific asset type represented in the ASSET_TYPE table 601 in the intermediate data warehouse. The master fact table is used to store all the relevant facts for every asset found in the ASSETS table 602 that has the same type as the data mart. As noted above, the value for the fact itself is a measure. A measure is stored in the master fact table together with an identifier to identify the type of the measure, referred to as the measure type identifier. A static dimension is used to list all the measure type identifiers which are populated in step 1290. For the master fact table, method 1200 retrieves the measure, the measure type identifier, and a time identifier. The timestamp associated with the time identifier is populated into a static dimension in step 1290.

To populate the master fact table, method 1200 queries the ASSET_TYPE 601, ASSETS 602, MEASURE_RUN 605, MEASURE_TYPE 606, and MEASURES 607 tables to retrieve every measure value for every measure type, for every asset with an asset type that matches the particular data mart. Optionally, method 1200 may only retrieve these values for a specific timestamp to update a data mart, or retrieve the entire data set to populate a new data mart.

At step 1220, a list of dynamic dimensions is identified. In accordance with the data mart structure created in the schema engine 902 of FIG. 9, there is a list of dynamic dimensions and three static dimensions. The list of dynamic dimensions is extracted from the model generated by the schema engine 902. This model serves as input to the data engine 906. Alternatively, the list of dynamic dimensions could be computed again using the logic found in the schema engine 902.

At step 1230, a main loop populates a dynamic dimension in each iteration. Static dimensions are populated later in step 1290. Every dynamic dimension has exactly one dynamically generated hierarchy associated with it. The hierarchy includes a set of tables. Each table has an identifier that associates the table with the dimension. At step 1240, a list of tables for the hierarchy is identified. The list of tables for the hierarchy may either be extracted from the schema engine model or computed with the logic found in the dimension generator 904.

At step 1250, the list of tables in a dynamic dimension hierarchy is processed top-down beginning with the root level table. At step 1260, all tables within a dynamic dimension hierarchy are populated using the same logic. Method 1200 queries the ASSET_TYPES 601, ASSETS 602, and ASSET_GROUP_MEMBERS 603 tables to extract all asset identifiers and parent asset identifiers for every asset (i) that is of the same type as the dimension; (ii) that is the same level as the table; and (iii) that has parent asset identifier already populated into the table above in the hierarchy. For the root level table, only the type of the dimension should match and the level should be zero. The data is queried from the intermediate data warehouse and directly inserted into the data mart table either through insert-select statements or any other means of data extract and load. Besides the asset identifier and parent asset identifier, method 1200 extracts all those attributes that describe the asset in the ASSETS table 601 and that may be populated into the mart table, e.g., asset name, asset description, etc.

Hierarchies are used to store data sets that may be represented as trees. There are three forms of trees and three matching forms of hierarchies. Trees may be either be balanced (all leaf nodes are at the same level), unbalanced (leaf nodes are not all at the same level, but there are no holes between the nodes), or ragged (all nodes are at the same level but there are holes between the nodes). The hierarchy generator 905, however, only links the leaf level table with the multiple fact table in the data mart schema. Such a linking mechanism only supports balanced hierarchies. In order to support unbalanced and ragged tree representations, unbalanced and ragged tree representations must be converted into balanced hierarchies in the following ways.

For a balanced tree representation, only those assets that have the exact same level as the table within the hierarchy (as described above) should be extracted. For an unbalanced tree representation, all assets are extracted that have the same or lower level identifier as the current table in the hierarchy; the requirement is that the parent asset identifier exists in the above table in the hierarchy. In addition, every leaf node in the tree must be carried forward to the leaf level table in the hierarchy. This may be done by copying assets that have no more children from higher level tables to lower level tables until the leaf level table is reached. For a ragged tree representation, logic similar to the logic for unbalanced trees is used. Holes in the tree representation will be automatically removed because lower level assets are allowed to be stored in a higher level table in the hierarchy. These holes are virtually shifted below the leaves in the tree. The holes are closed in the hierarchy by copying nodes with no children.

At step 1270, the method 1200 repeats steps 1250 and 1260 until no more tables exist in the hierarchy and the leaf table is reached. At step 1280, to associate the facts stored in the master fact table with the data stored in the hierarchies, a table is used that links the identifiers found in the master fact table with the identifiers found in the dimensions. Such a table is referred to as a multiple fact table. A multiple fact table merely references the facts with the appropriate dimension and does not contain any data itself. To make the association time sensitive, a time identifier is added. The query used to populate each multiple fact table reads from the ASSET_TYPE 601, ASSETS 602, and ASSET_REFERENCES 604 tables to obtain all the asset identifiers used in the fact table and to map them to the asset identifier used in the dimension. The asset identifier in the fact table is of the same type as the data mart, whereas the asset identifier used in the dimension will match the type of the dimension. The ASSET_REFERENCES table 604 contains all the associations regardless of the asset type. The query is constructed using filters on asset types. Further, the timestamp is retrieved representing the time at which the association was valid. There may be cases where an asset identifier found in a dimension has no association to any asset identifier found in the fact table. Such "orphaned" assets may either be ignored or be grouped and associated with a dummy fact group.

At step 1285, the method 1200 repeats steps 1230 through 1280 until all dynamic dimensions have been processed. At step 1290, the remaining three dimensions to be populated are static dimensions for storing information about time, measure types, and string attributes.

To populate the static dimension for time, the method 1200 proceeds as follows. First, the timestamps for every measure for every asset of every type are available in the MEAS_RUN table 605. Method 1200 queries this table and joins it with the ASSET_TYPE 601 and ASSETS 602 tables to filter only those timestamps that are needed for any measure for any asset that has the same type as the data mart. Different timestamps that represent different events (e.g., asset creation, population, update) may also be populate into the same time dimension provided different identifiers are used for the different timestamps.

To populate the static dimension for measure types, the method 1200 proceeds as follows. First, the values stored in the master fact table are measures of different types. The measure type dimension identifies the type of these measures. Every asset type has a list of relevant measure types. The method 1200 queries the ASSET_TYPE 601 and MEASURE_TYPE 602 tables in the intermediate data warehouse to obtain measure types relevant to our type of data mart.

To populate the optional static dimension for attributes, the method 1200 proceeds as follows. First, if the schema engine 902 generates a static dimension for attributes in step 1180, then the static dimension for attributes is populated at this step. The static dimension for attributes is only required if a consuming downstream application requires it. Instead of a normalized representation of facts as measures of a specific type (as done above with the measure types dimension), a de-normalized representation for attributes is instead used. The attributes dimension has one column for every attribute type. Further, the values of the columns are directly stored in the cells of the columns. A nested loop is used to populate the cells. In the outer loop, method 1200 queries the ASSET_TYPE 601, ASSETS 602, MEASURE_RUN 605, MEASURE_TYPE 606, and MEASURES 607 tables in the same manner as in step 885. In the inner loop, method 1200 processes the results of the query and inserts the data into the proper column as identified by the measure type. Alternatively, method 1200 may query the master fact table directly and insert the data into the attributes table. After step 1290, once all tables have been populated, the method 1200 terminates.

Figure 14:
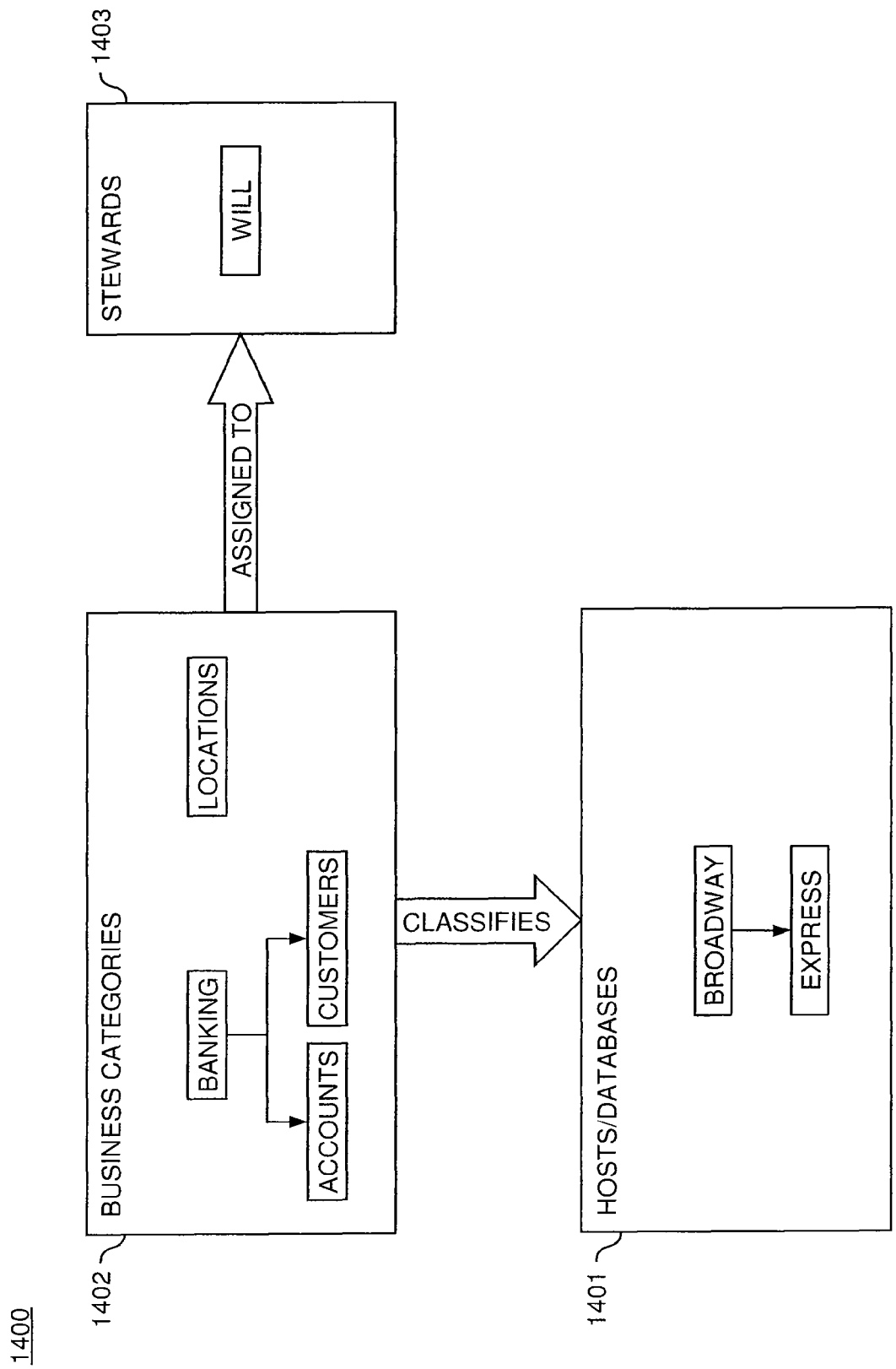
FIG. 14 is a block diagram illustrating a data sample in data repositories, according to one embodiment of the invention.

To demonstrate the dynamic construction of marts, dimensions, and hierarchies, a small data sample is extracted from the example shown in FIG. 1. FIG. 14 is a block diagram illustrating the data sample, according to one embodiment of the invention. The data sample includes a list of host systems and databases, business categories, and stewards. There are two types of associations defined: stewards are assigned to business categories, and business categories classify host systems and databases.

Figure 15:
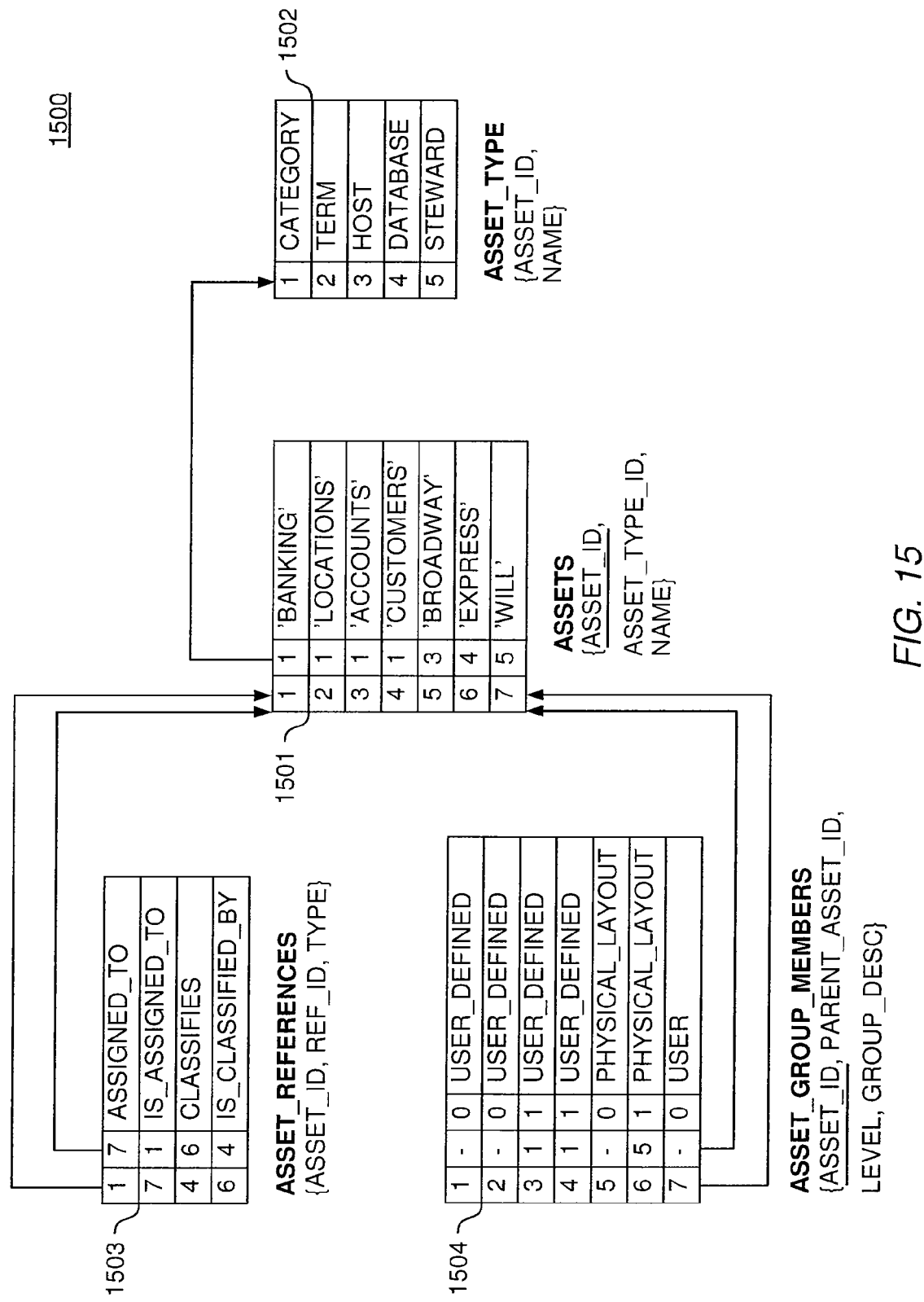
FIG. 15 is a block diagram illustrating a partial example of an intermediate data warehouse schema, according to one embodiment of the invention.

To further demonstrate the dynamic construction of marts, dimensions, and hierarchies, FIG. 15 illustrates how the data sample shown in FIG. 14 may be represented in an intermediate data warehouse with a schema as defined in FIG. 6. Only four of the seven tables are shown of the schema defined in FIG. 6, namely the ASSETS 602, ASSET_TYPE 601, ASSET_REFERENCES 604, and ASSET_GROUP_MEMBERS 603 tables. These are the four tables required to represent associations and to generate data marts, hierarchies, and dimensions. They are not sufficient to generate facts and measures, however. The example is further simplified by showing only a subset of columns for each of the four tables. The column names are presented in braces with the primary key column underlined.

Figure 16:
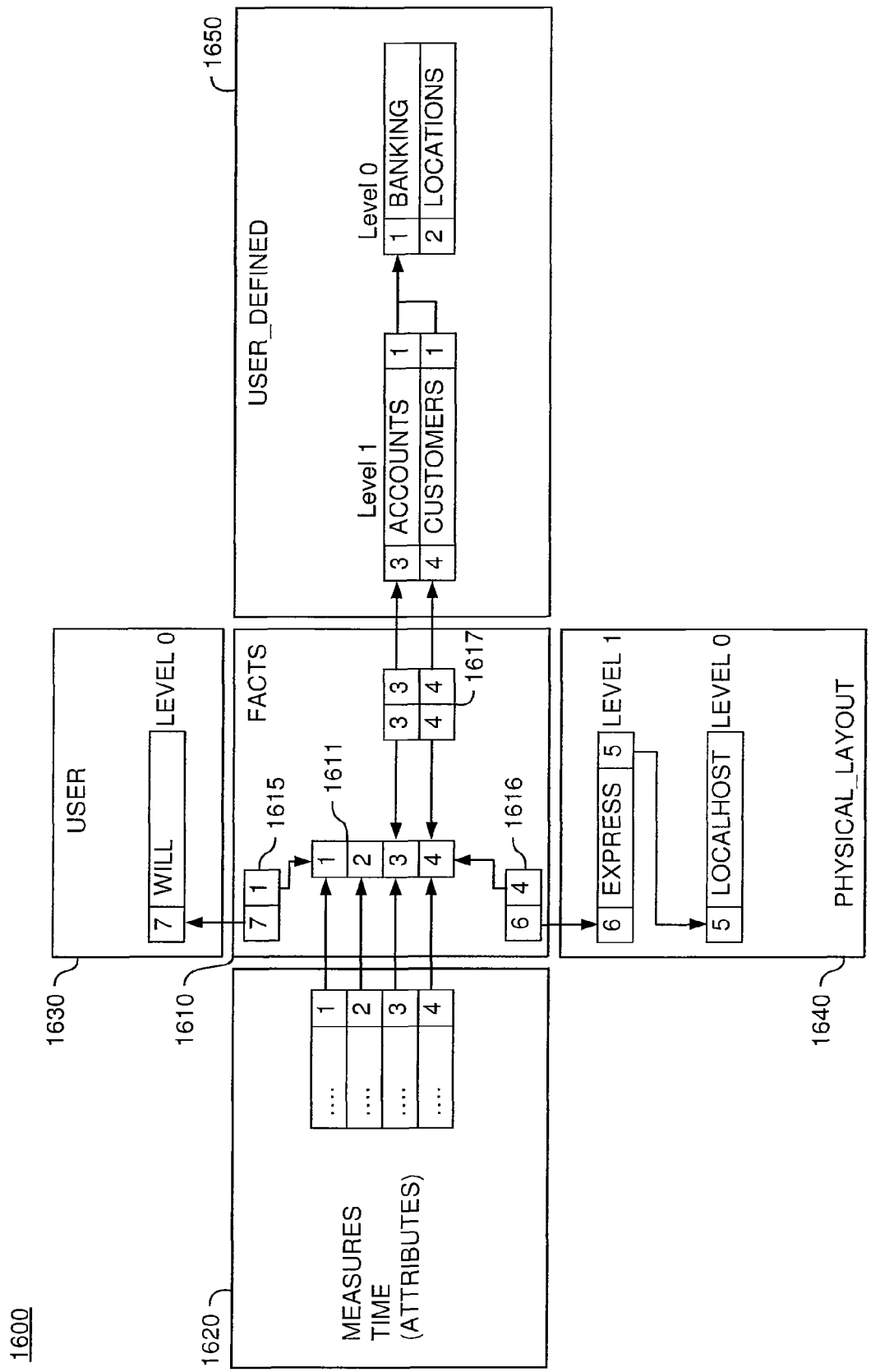
FIG. 16 is a block diagram illustrating a partial example of a data mart schema, according to one embodiment of the invention.

The ASSET_TYPE "Category" is highlighted bold and shall be the asset type used to generate a data mart in FIG. 16.

To further demonstrate the dynamic construction of marts, dimensions, and hierarchies, based on the sample data warehouse schema shown in FIG. 15, a data mart may be generated and populated using the procedure described in FIGS. 7 and 8. FIG. 16 illustrates the data mart for assets of type "Category". The data mart contains three dynamic dimensions named "USER_DEFINED" 1650, "PHYSICAL_LAYOUT" 1640, and "USER" 1630, and has the static dimensions 1620 to represent measures, time, and optionally, attributes.

The dynamic dimensions have hierarchies with one level for the 'USER' dimension and two levels for the "USER_DEFINED" and "PHYSICAL_LAYOUT" dimensions, respectively. Data items are (i) populated into the appropriate level within the correct dimension and (ii) linked together using the unique identifier.

There is one master fact table 1611 containing all four unique identifiers for the four categories found in the sample data. Additionally, three multiple-fact tables 1615-1617 are generated and populated to link the hierarchies in the dynamic dimensions with the master fact table.

Of course, the embodiments described herein are intended to be illustrative and not limiting of the invention, and other embodiments are broadly contemplated. Those skilled in the art will recognize, for example, that data mart schemas other than a snowflake schema, such as a star schema, may be supported by embodiments of the invention. Moreover, association information between assets may be found in a data repository, specified in a user configuration, or both. Furthermore, the static dimension for attributes may be optional in some embodiments of the invention where downstream applications do not require the static dimension for attributes. Further still, the static dimension for time may be optional in some embodiments of the invention where a historical view of data is not required. In addition, the data repositories may be of any type, such as relational, object, or object-relational.

While the foregoing is directed to embodiments of the present invention, other and further embodiments of the invention may be devised without departing from the basic scope thereof, and the scope thereof is determined by the claims that follow.

What is claimed is:

1. A computer-implemented method for dynamically building and populating a data mart with data from a data repository, comprising:
    receiving a user configuration that specifies a data repository and an asset type in the data repository;
    generating a schema for an intermediate data warehouse for storing data relevant to the asset type, wherein the data relevant to the asset type comprises at least one measures for at least one asset of the asset type and wherein the schema for the intermediate data warehouse comprises a timestamp to allow versioning of records in the intermediate data warehouse;

populating the intermediate data warehouse by querying the data repository for the data relevant to the asset type;

generating a schema for a data mart corresponding to the asset type; and populating the data mart by querying the intermediate data warehouse for the data relevant to the asset type.

2. The method of claim 1, wherein the schema for the data mart comprises facts, dimensions, and hierarchies.

3. The method of claim 1, wherein the schema for the data mart comprises a master fact table, a multiple fact table, a static dimension representing measures, and a dynamic dimension representing an asset group; and wherein the multiple fact table links the dynamic dimension to the master fact table.

4. The method of claim 1, wherein the user configuration further specifies measure types and associations between asset types, wherein the data relevant to the asset type further comprises associations between asset types, and wherein the dimensions are dynamically derived from associations between asset types.

5. The method of claim 4, wherein the at least one measure includes at least one of a simple measure and a complex measure; wherein the user configuration further specifies an input measure and an algorithm for each complex measure type; wherein each complex measure is computed using the input measure and the algorithm specified by the user configuration; and wherein the data relevant to the asset type is stored with a timestamp to allow versioning of the data relevant to the asset type.

6. The method of claim 1, wherein the schema for the intermediate data warehouse is a vertical schema, and wherein the schema for the data mart is selected from at least a snowflake schema and a star schema.

7. A computer readable storage medium containing a program which, when executed, performs an operation for dynamically building and populating a data mart with data from a data repository, comprising:

receiving a user configuration that specifies a data repository and an asset type in the data repository;

generating a schema for an intermediate data warehouse for storing data relevant to the asset type, wherein the data relevant to the asset type comprises at least one measure for at least one assets of the asset type and wherein the schema for the intermediate data warehouse comprises a timestamp to allow versioning of records in the intermediate data warehouse;

populating the intermediate data warehouse by querying the data repository for the data relevant to the asset type;

generating a schema for a data mart corresponding to the asset type; and populating the data mart by querying the intermediate data warehouse for the data relevant to the asset type.

8. The computer-readable storage medium of claim 7, wherein the schema for the data mart comprises facts, dimensions, and hierarchies.

9. The computer-readable storage medium of claim 7, wherein the schema for the data mart comprises a master fact table, a multiple fact table, a static dimension representing measures, and a dynamic dimension representing an asset group; and wherein the multiple fact table links the dynamic dimension to the master fact table.

10. The computer-readable storage medium of claim 7, wherein the user configuration further specifies measure types and associations between asset types, wherein the data relevant to the asset type further comprises associations between asset types, and wherein the dimensions are dynamically derived from associations between asset types.

11. The computer-readable storage medium of claim 10, wherein the at least one measure includes at least one of a simple measure and a complex measure; wherein the user configuration further specifies an input measure and an algorithm for each complex measure type; wherein each complex measure is computed using the input measure and the algorithm specified by the user configuration; and wherein the data relevant to the asset type is stored with a timestamp to allow versioning of the data relevant to the asset type.

12. The computer-readable storage medium of claim 7, wherein the schema for the intermediate data warehouse is a vertical schema, and wherein the schema for the data mart is selected from at least a snowflake schema and a star schema.

13. A system, comprising:

a processor; and a memory containing a program, which when executed by the processor is configured to perform an operation for dynamically building and populating a data mart with data from a data repository, comprising:

receiving a user configuration that specifies a data repository and an asset type in the data repository;

generating a schema for an intermediate data warehouse for storing data relevant to the asset type, wherein the data relevant to the asset type comprises at least one measure for at least one assets of the asset type;

populating the intermediate data warehouse by querying the data repository for the data relevant to the asset type and wherein the schema for the intermediate data warehouse comprises a timestamp to allow versioning of records in the intermediate data warehouse;

generating a schema for a data mart corresponding to the asset type; and populating the data mart by querying the intermediate data warehouse for the data relevant to the asset type.

14. The system of claim 13, wherein the schema for the data mart comprises facts, dimensions, and hierarchies.

15. The system of claim 13, wherein the schema for the data mart comprises a master fact table, a multiple fact table, a static dimension representing measures, and a dynamic dimension representing an asset group; and wherein the multiple fact table links the dynamic dimension to the master fact table.

16. The system of claim 13, wherein the user configuration further specifies measure types and associations between asset types, wherein the data relevant to the asset type further comprises associations between asset types, and wherein the dimensions are dynamically derived from associations between asset types.

17. The system of claim 16, wherein the at least one measure includes at least one of a simple measure and a complex measure; wherein the user configuration further specifies an input measure and an algorithm for each complex measure type; wherein each complex measure is computed using the input measure and the algorithm specified by the user configuration; and wherein the data relevant to the asset type is stored with a timestamp to allow versioning of the data relevant to the asset type.

18. The system of claim 13, wherein the schema for the intermediate data warehouse is a vertical schema, and wherein the schema for the data mart is selected from at least a snowflake schema and a star schema.

19. A computer-implemented method for dynamically building and populating a plurality of data marts with data from a plurality of data repositories, comprising:

receiving user configuration input that specifies the plurality of data repositories and a plurality of asset types in the plurality of data repositories, wherein the specified plurality of data repositories contain: (i) a plurality of assets of the specified plurality of asset types; (ii) at least one association between assets of two asset types; (iii) at least one asset group that groups assets based on the at least one association between two asset types; and (iv) a plurality of measures of at least one measure type, wherein the plurality of measures contain values that describe the plurality of assets;

generating a schema for an intermediate data warehouse for storing data relevant to the specified plurality of asset types, wherein the data relevant to the specified plurality of asset types comprises: (i) at least one measure for at least one measure types for assets of the specified plurality of asset types; (ii) at least one association between an asset of one asset type of the specified plurality of asset types and an asset of another asset type of the specified plurality of asset types; and (iii) at least one asset group that groups assets of the specified plurality of asset types; and wherein the schema for the intermediate data warehouse comprises a timestamp to allow versioning of records in the intermediate data warehouse;

populating the intermediate data warehouse by querying the specified plurality of data repositories for the data relevant to the specified plurality of asset types;

generating, for each asset type of the specified plurality of asset types, a schema for a data mart corresponding to the respective asset type; wherein the schema for the data mart comprises (i) a static dimension representing measure types and (ii) a static dimension representing time to allow versioning of records in the data mart; wherein a static dimension is a dimension that exists in each of the plurality of data marts; and populating, for each asset type of the specified plurality of asset types, the data mart corresponding to the respective asset type by querying the intermediate data warehouse for the data relevant to the respective asset type.

20. The method of claim 19, wherein the schema for the data mart further comprises a master fact table, a multiple fact table, and a dynamic dimension representing an asset group; wherein a dynamic dimension is specific to the respective data mart and represents an asset group; and wherein the multiple fact table links the dynamic dimension to the master fact table.

21. The method of claim 19, wherein the user configuration input further specifies measure types and associations between assets of different asset types; wherein the schema for the intermediate data warehouse is a vertical schema; wherein the schema for each data mart is selected from at least a snowflake schema and a star schema; wherein the at least one measure includes at least one of a simple measure and a complex measure; wherein the simple measures contains values found in the plurality of data repositories; wherein the complex measures contains values computed from values found in the plurality of data repositories; wherein the user configuration input further specifies, for each complex measure type, an input measure and an algorithm; and wherein each complex measure is computed using the input measure and the algorithm specified by the user configuration input.

22. The method of claim 19, wherein each data repository is selected from at least a relational repository, an object repository, and an object-relational repository.

23. A computer readable storage medium containing a program which, when executed, performs an operation for dynamically building and populating a data mart with data from a data repository, comprising:

receiving user configuration input that specifies the plurality of data repositories and a plurality of asset types in the plurality of data repositories, wherein the specified plurality of data repositories contain: (i) a plurality of assets of the specified plurality of asset types; (ii) at least one association between assets of two asset types; (iii) at least one asset group that groups assets based on the at least one association between two asset types; and (iv) a plurality of measures of at least one measure type, wherein the plurality of measures contain values that describe the plurality of assets;

generating a schema for an intermediate data warehouse for storing data relevant to the specified plurality of asset types, wherein the data relevant to the specified plurality of asset types comprises: (i) at least one measure for at least one measure type for assets of the specified plurality of asset types; (ii) at least one association between an asset of one asset type of the specified plurality of asset types and an asset of another asset type of the specified plurality of asset types; and (iii) at least one asset group that groups assets of the specified plurality of asset types; and wherein the schema for the intermediate data warehouse comprises a timestamp to allow versioning of records in the intermediate data warehouse;

populating the intermediate data warehouse by querying the specified plurality of data repositories for the data relevant to the specified plurality of asset types;

generating, for each asset type of the specified plurality of asset types, a schema for a data mart corresponding to the respective asset type; wherein the schema for the data mart comprises (i) a static dimension representing measure types and (ii) a static dimension representing time to allow versioning of records in the data mart; wherein a static dimension is a dimension that exists in each of the plurality of data marts; and populating, for each asset type of the specified plurality of asset types, the data mart corresponding to the respective asset type by querying the intermediate data warehouse for the data relevant to the respective asset type.

24. The computer-readable storage medium of claim 23, wherein the schema for the data mart further comprises a master fact table, a multiple fact table, and a dynamic dimension representing an asset group; wherein a dynamic dimension is specific to the respective data mart and represents an asset group; and wherein the multiple fact table links the dynamic dimension to the master fact table.

25. The computer-readable storage medium of claim 23, wherein the user configuration input further specifies measure types and associations between asset types; wherein the schema for the intermediate data warehouse is a vertical schema; wherein the schema for each data mart is selected from at least a snowflake schema and a star schema; wherein the at least one measure includes at least one of a simple measure and a complex measure; wherein the simple measures contains values found in the plurality of data repositories; wherein the complex measures contains values computed from values found in the plurality of data repositories; wherein the user configuration input further specifies, for each complex measure type, an input measure and an algorithm; and wherein each complex measure is computed using the input measure and the algorithm specified by the user configuration input.

* * * * *